(12) United States Patent
Seto et al.

(10) Patent No.: US 7,334,898 B2
(45) Date of Patent: Feb. 26, 2008

(54) PROJECTOR

(75) Inventors: Takeshi Seto, Chofu (JP); Kunihiko Takagi, Okaya (JP); Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 305 days.

(21) Appl. No.: 10/957,714

(22) Filed: Oct. 5, 2004

(65) Prior Publication Data

US 2005/0157269 A1    Jul. 21, 2005

(30) Foreign Application Priority Data

Oct. 10, 2003    (JP) .............................. 2003-352675

(51) Int. Cl.
*G03B 21/16* (2006.01)

(52) U.S. Cl. .......................................... 353/61; 353/54

(58) Field of Classification Search .................. 353/54, 353/61, 60; 313/35, 36; 362/555, 561, 800
See application file for complete search history.

(56) References Cited

U.S. PATENT DOCUMENTS

| | | | |
|---|---|---|---|
| 6,004,010 A * | 12/1999 | Inage et al. .................. 362/294 |
| 6,443,575 B1 * | 9/2002 | Miyamoto et al. ............. 353/58 |
| 6,450,646 B1 * | 9/2002 | Ono et al. ..................... 353/57 |
| 6,488,378 B1 * | 12/2002 | Tabuchi et al. ................ 353/52 |
| 6,758,583 B2 * | 7/2004 | Hsu et al. ..................... 362/373 |
| 6,991,335 B2 * | 1/2006 | Kondo et al. .................. 353/54 |
| 2002/0191159 A1 * | 12/2002 | Nagao et al. .................. 353/54 |
| 2005/0219471 A1 * | 10/2005 | Kitabayashi .................. 353/54 |
| 2006/0044524 A1 * | 3/2006 | Feliss et al. .................. 353/54 |

FOREIGN PATENT DOCUMENTS

| | | |
|---|---|---|
| JP | U-1-75288 | 5/1989 |
| JP | 05-181110 | 7/1993 |
| JP | 07-142886 | 6/1995 |
| JP | 08-242463 | 9/1996 |
| JP | 11-204952 | 7/1999 |
| JP | 2000-305470 | 11/2000 |
| JP | 2002-174857 | 6/2002 |
| JP | 2002-374004 | 12/2002 |

* cited by examiner

*Primary Examiner*—William C. Dowling
(74) *Attorney, Agent, or Firm*—Oliff & Berridge, PLC

(57) ABSTRACT

A light source to emit light, an optical structure constituting an optical system to modulate or combine emission light of the light source, a projection element to project exit light of from the optical structure, a flow passage to flow a cooling fluid to cool the light source, and a housing structuring an exterior are provided. The flow passage has a connection flow passage connected to the light source and a heat-releasing flow passage continuing with the connection flow passage. The heat-releasing flow passage is provided on the housing. This can provide a projector enhanced in cooling efficiency by natural cooling without using a fan.

32 Claims, 17 Drawing Sheets

PROJECTOR

BACKGROUND

Exemplary aspects of the present invention relate to projectors and more particularly to a projector in which a cooling fluid is circulated in order to cool down the light source.

Related art projectors have had an increase in brightness and reduction in size, increasing the in-device heat density. For this reason, further enhancement of cooling performance is required for the cooling device to cool the light source as a heat generation source and the light valve to be heated by suffering emission light of the light source. In such circumstances, the situation is true for the projector using light-emitting diodes (LEDs), or light-emitting elements, in the light source, requiring to further enhance the cooling performance.

In the case of a related art projector using light-emitting diodes (LEDs), or light-emitting elements, in the light source, there is a proposal of a lighting device to be used as a light source of the projector by outputting illumination light having a light intensity distribution uniform on the illumination plane by use of an LED-arrayed panel arranging a plurality of LED elements (JP-A-2002-374004).

In the case of a related art projector using a cathode ray tube, there is a proposal of a device that a cooling tank is provided contacting with the surface of a cathode ray tube to display images and a cooling liquid is filled therein so that the cooling liquid can be circulated to the cooling tank through a circulation mechanism thereby lowering the temperature of the cathode ray tube (JP-A-8-242463).

In the case of a related art liquid-crystal projector to illuminate the light from the light source onto the liquid-crystal panel and thereby project a display image on the liquid-crystal panel to a screen, a transparent cooling medium vaporable by heat is sealed within a vessel forming on both surfaces of transparent regions greater in area than the display region of the liquid-crystal panel. This vessel is provided with a cooler having a vaporization refrigerant container chamber for the cooling medium vaporized by absorbing heat to again liquefy and release heat externally of the vessel. By arranging a liquid-crystal panel over the surface of the cooler, the heat generated on the liquid-crystal panel is cooled down (JU-A-1-75288).

SUMMARY

However, according to JP-A-8-242463, the circulation mechanism uses a metal tube or a heat-releasing plate to release heat to effect cooling. However, for cooling by use of a cooling fan, there is a necessity of providing a cooling fan at the inside of the housing structuring the projector exterior, hence raising a problem of significant size-increase of the projector. There is also a problem that the use of a fan poses a limitation concerning projector noise. According to JU-A-1-75288, there exists a fan to cool the cooling medium within the housing, to release the heat within the housing to the outside of the housing. Consequently, in the case of using light-emitting diodes (LEDs) in the light source, there is a problem that limits arise with respect to projector size reduction and noise.

According to JP-A-8-242463, in a case not using a cooling fan, cooling is by utilization of natural cooling within the housing. Where a cathode ray tube is used, cooling is available because the cathode ray tube has a great heat generation amount to secure a temperature difference from the housing inside. In the case where light-emitting diodes (LEDs) are used as the light source, a heat generation amount is low as compared to the heat generation amount on the cathode ray tube. However, there is a necessity to keep the light source itself at a lower temperature. Accordingly, there is a problem that, with natural cooling at the housing inside where temperature rises, there is a small temperature difference between the temperature of the liquid being circulated and the temperature inside the housing, raising a problem of low cooling efficiency.

Exemplary aspects of the present invention have been made in view of the above and/or other problems, and provide a projector whose cooling efficiency is enhanced by natural cooling without using a fan.

In order to address and/or solve the foregoing and/or other problems, a projector of an exemplary aspect of the present invention is characterized by including: a light source to emit light; an optical structure constituting an optical system to modulate or combine emission light of the light source; a projection element to project the exit light from the optical structure; a flow passage to flow a cooling fluid to cool the light source; and a housing structuring an exterior. The flow passage has a connection flow passage connected to the light source and a heat-releasing flow passage continuing with the connection flow passage. The heat-releasing flow passage is provided on the housing.

According to this projector, because the heat-releasing flow passage is provided on the housing, natural cooling is made possible utilizing a flow (convection) of the external air. Cooling efficiency can be enhanced as compared to the case there is a heat-releasing flow passage within the housing as in the related art.

According to an exemplary embodiment of the invention, the projector may include a pump to circulate the cooling fluid in the flow passage.

According to this projector, because the use of the pump makes it possible to positively flow and circulate the cooling fluid in the flow passage, cooling efficiency can be enhanced furthermore.

According to an exemplary embodiment of the invention, the projector is characterized in that the heat-releasing flow passage is formed by the housing and at least one member joined to the housing, and formed by providing a space to circulate the cooling fluid between the housing and the member.

According to this projector, because the housing and the flow passage can be formed integral and the housing serves also as a part of the flow passage, cooling efficiency can be enhanced furthermore.

According to an exemplary embodiment of the invention, the projector is characterized in that a heat-releasing fin is provided in an outer surface of the housing.

According to this projector, because heat can be released by the fin even when the flow passage is provided on the inner side surface of the housing, cooling efficiency can be enhanced furthermore.

According to an exemplary embodiment of the invention, the projector is characterized in that the heat-releasing flow passage is formed protruding in an outer surface of the housing and serving also as a heat-releasing fin.

According to this projector, because the heat-releasing flow passage is provided protruding at the outer surface of the housing, there is positive functioning as a fin to release the heat from the cooling fluid to the external air. Thus, cooling efficiency can be enhanced furthermore.

According to an exemplary embodiment of the invention, the projector is characterized in that an aperture for maintenance is provided in a position of the housing opposed to the light source and the optical structure. A cover member covering the aperture is provided. The heat-releasing flow passage is provided around the aperture.

According to this projector, by the provision of the aperture for maintenance, post-assembling maintenance operations can be performed by use of the aperture without the need to remove the first housing member and the second housing member. Due to this, the efficiency of maintenance operation is enhanced. Because of the provision of the heat-releasing flow passage around the aperture, there is no need to remove the flow passage connection upon removing the cover member in order for maintenance operations.

According to an exemplary embodiment of the invention, the projector is characterized in that the housing is structured at least by a first housing member and a second housing member. A heat-releasing flow passage is provided on the first housing member. The light source and the connection flow passage are provided on the second housing member. An aperture for maintenance is provided in a position of the first housing opposed to the light source and the optical structure. A cover member covering the aperture is provided. The heat-releasing flow passage is provided around the aperture.

According to this projector, in the case of connecting between the heat-releasing flow passage provided in the first housing member and the connection flow passage connected to the second housing member, a passage connecting operation can be performed by use of the aperture for maintenance provided in the first housing after assembling the first housing member and the second housing member together, thus enhancing operation efficiency. Because post-assembling maintenance operations can be performed by use of the aperture similarly without the need of removing the first and second housing members, operation efficiency is enhanced. Because of the provision of the heat-releasing flow passage around the aperture, removal of passage connection is not required upon removing the cover member in order for maintenance operations.

In this manner, by taking the form in which the aperture is provided, the necessity of removing the first and second housing members during maintenance is eliminated. Consequently, the need of using a plastic or silicone flexible tube on the flow passage to remove the first and second housing members is eliminated. Because of no need for a flexible tube having a great gas transmission amount, a problem, such as vaporization of the cooling fluid is eliminated. In addition, there is no necessity for a reserve tank to supplement the cooling fluid that is vaporized. This contributes to projector size reduction.

According to an exemplary embodiment of the invention, the projector is characterized that the housing is structured at least by a first housing member and a second housing member. The first housing member having the heat-releasing flow passage, the connection flow passage and the light source.

According to this projector, the flow passage to flow the cooling fluid and the light source are all built in the first housing member. Consequently, the connection flow passage and the heat-releasing flow passage can be assembled in a connection state in the first housing member. Accordingly, because the need of flow passage connections after assembling the first and second housing members is eliminated, the operation efficiency of flow passage connection can be enhanced furthermore.

According to an exemplary embodiment of the invention, the projector is characterized in that the housing is structured at least by a first housing member and a second housing member, the first housing member having the heat-releasing flow passage, the connection flow passage, the light source, the optical structure and the projection element.

According to this projector, there is an effect of enhancing the operation efficiency of flow passage connection.

Due to the provision of the light source, optical structure and projection element in the first housing member, the light source, optical structure and projection element can be assembled to the first housing member in a state where an optical adjustment operation, such as optical axis adjustment to align the optical axes in an optical system of the emission light from the light source to the projection element has been made. Because of the capability of performing an optical adjustment, such as optical axis adjustment in a state where the light source, optical structure and projection element are assembled on the first housing member, freedom is provided in optical adjustment operations making possible to enhance the efficiency of operation.

According to an exemplary embodiment of the invention, the projector is characterized in that the housing is structured at least by a first housing member and a second housing member. The first housing member has the heat-releasing flow passage, the connection flow passage, the light source and the optical structure. The second housing member has the projection element, a positioning mechanism is provided to position the first housing member and the second housing member in position so that the optical structure and the projection element can be aligned during assembling the first housing member and the second housing member together.

According to this projector, because positioning can be made for the light source and optical structure on the first housing member side and the projection element on the second housing member side during assembling, optically adjusted positional relationship, such as at optical axes, can be kept even in case that the optical system is separated as a first housing member and a second housing member.

According to an exemplary embodiment of the invention, the projector is characterized in that the housing is structured at least by a first housing member and a second housing member. The first housing member has a pump to circulate the cooling fluid in the flow passage.

According to this projector, the cooling fluid can be positively caused to flow and circulate in the flow passage by use of the pump as compared to circulation utilizing vaporization—condensation of the cooling fluid, hence making possible to enhance cooling efficiency furthermore.

According to an exemplary embodiment of the invention, the projector is characterized in that the first housing member configures an upper part including at least a top surface of the housing. The second housing member configures a lower part including at least a bottom surface of the housing, at least the heat-releasing flow passage being provided on the first housing member.

According to this projector, by providing a cooling flow passage on a top surface or side surfaces of the first housing member where convection readily occurs in the external air, the cooling efficiency of natural cooling is enhanced furthermore.

According to an exemplary embodiment of the invention, the projector is characterized in that a heat-conductive member is provided to conduct heat generated at the optical structure to the connection flow passage.

According to this projector, even in the case that the optical structure, such as a light valve, is heated up by emission light of the light source, the heat is conducted to the flow passage through the heat-conductive member thus being cooled down. The optical structure can exhibit the function in nature without undergoing the affection of heat.

According to an exemplary embodiment of the invention, the projector is characterized in that the light source has a light-emitting element or a light-emitting element array as a light source.

According to this projector, by using a light-emitting element, e.g. a light-emitting diode (LED) or an element structuring light-emitting diodes (LEDs) in an array form, in the light source, the light source can be reduced in size thus contributing to great size reduction of the projector. In the case of using a light emitting element or a light-emitting element array in the light source, the amount of heat generation is not so much. But there is a need to keep the temperature of the light source itself lower. With natural cooling within the housing where temperature is to rise, the difference is small between the temperature of the circulating liquid and the temperature within the housing, thus making cooling efficiency low. Accordingly, natural cooling is made possible by providing the heat-releasing flow passage on the outer surface of housing.

According to an exemplary embodiment of the invention, the projector is characterized in that the light source has a light-emitting element, a light-emitting element base firmly fixing the light-emitting element, an inlet passage in the light-emitting element base for the cooling fluid to cool the light source, and an outlet passage, the inlet passage and the outlet passage being provided generally parallel with a plane of the light-emitting element base on which the light-emitting element is firmly fixed.

Here, a light-emitting diode (LED) can be employed as the light-emitting element.

According to this projector, although the light-emitting element can be cooled down directly or indirectly by the cooling fluid, the inlet and outlet passages to cool fluid are provided nearly parallel with a plane of the light-emitting element firmly fixed on the light-emitting element base. Because the flow passage for the cooling fluid is controlled within the light source, the cooling fluid is allowed to flow smoothly, thus making possible to enhance cooling effect.

By flowing the cooling fluid, the light-emitting element can be directly or indirectly cooled down with efficiency.

In this manner, because the cooling fluid can be reduced in flow rate, the pressure of the cooling fluid can be decreased. Because this can reduce the stress applied to the light emitting element itself or to the connection where the light-emitting element and the external control circuit are electrically connected, the performance of the light source can be maintained over a long term.

According to an exemplary embodiment of the invention, the projector is characterized in that a grip member to grasp the projector main body is provided on the housing.

According to this projector, due to the provision of the grip member on the housing, the projector can be moved by grasping the grip member.

According to an exemplary embodiment of the invention, the projector is characterized by having a grip to grasp the projector main body on the housing, the heat-releasing flow passage being provided around the grip.

According to this projector, because the housing has the grip, to provide the heat-releasing flow passage around the same, the user is allowed to move the projector by grasping the grip member. At the same time, natural cooling utilizing external air flow can be made by the heat-releasing flow passage, thereby making possible to cool down the cooling fluid.

According to an exemplary embodiment of the invention, the projector is characterized in that a grip member to grasp the projector main body is provided on the grip.

According to this projector, because the housing has the grip, to provide the grip member in the grip, the user is allowed to move the projector by grasping the grip. At the same time, natural cooling utilizing external air flow can be made by the heat-releasing flow passage, thereby making possible to cool down the cooling fluid.

According to an exemplary embodiment of the invention, the projector is characterized in that the grip is provided with an aperture for maintenance and a cover member covering the aperture.

According to this projector, because the aperture for maintenance and the cover member are provided in the grip of the housing, maintenance is possible to the projector interior through the aperture without disassembling the projector housing or removing the heat-releasing flow passage. After maintenance, by attaching the cover member, the projector can be moved by grasping the grip.

According to an exemplary embodiment of the invention, the projector is characterized by having a support to support the heat-releasing flow passage in the housing, the heat-releasing flow passage is pressure-fit and fixed in the support.

According to this projector, the heat-releasing flow passage is fixed in the support. Because the heat of the cooling fluid is allowed to conduct to the housing through the heat-releasing flow passage, the cooling fluid can be cooled down.

According to an exemplary embodiment of the invention, the projector is characterized in that the heat-releasing flow passage is arranged in the support, and fixed in the support by expanding the heat-releasing flow passage by a high-pressure fluid.

According to this projector, the heat-releasing flow passage is fixed in the support further positively. Because the heat of the cooling fluid is conducted to the housing through the heat-releasing flow passage, the cooling fluid can be cooled down.

According to an exemplary embodiment of the invention, the projector is characterized in that a heat-conductive member to conduct heat is provided and fixed between the support and heat-releasing flow passage.

According to this projector, because the heat of the heat-releasing flow passage is readily conducted to the housing furthermore by passing through the heat-conductive member, cooling efficiency is enhanced furthermore.

According to an exemplary embodiment of the invention, the projector is characterized by including a support member supporting the heat-releasing flow passage and a support to support the support member on the housing, the support member being pressure-fit with the heat-releasing flow passage and fixed in the support.

According to this projector, the heat-releasing flow passage is held and fixed more firmly to the support by the support member and the heat of the heat-releasing flow passage is allowed to readily conduct to the housing through the heat-conductive member, whereby the cooling fluid can by cooled efficiently.

According to an exemplary embodiment of the invention, the projector is characterized in that the support member and the heat-releasing flow passage are arranged in the support, and fixed in the support by expanding the heat-releasing flow passage by a high-pressure fluid.

According to this projector, the heat-releasing flow passage is fixed further positively in the support through the support member. Due to conduction of the heat of the heat-releasing flow passage to the housing through the support member, the cooling fluid can be cooled efficiently.

According to an exemplary embodiment of the invention, the projector is characterized in that a heat-conductive member to conduct heat is provided and fixed at least one of between the support and the supporting member and between the support member and the heat-releasing flow passage.

According to this projector, the heat of the heat-releasing flow passage is readily conducted to the housing furthermore by passing through the heat-conductive member as compared to the case the heat-conductive member is not provided, enhancing cooling efficiency furthermore.

According to an exemplary embodiment of the invention, the projector is characterized that the heat-releasing flow passage is formed within a main body of the housing.

According to this projector, because the heat-releasing flow passage is formed within the main body of the housing, the heat of the cooling fluid is directly conducted to the housing, making it possible to efficiently cool down the heat of the cooling fluid.

Because of no provision of the heat-releasing flow passage on the exterior surface side of the projector, freedom is given in the design of the housing form, various switch panels arranged on the housing exterior surface, various printings and so on.

According to an exemplary embodiment of the invention, the projector is characterized in that the heat-releasing flow passage is inserted in a main body of the housing.

According to this projector, because the heat of the cooling fluid is efficiently conducted to the housing, the heat of the cooling fluid can be cooled down.

According to an exemplary embodiment of the invention, the projector is characterized in that the housing is structured by a main housing member and a sub housing member. A plurality of through-holes are formed within a main body of the main housing member, the heat-releasing flow passage is structured by joining the main housing member and the sub housing member together.

According to this projector, because the heat of the cooling fluid is efficiently conducted to the housing by the heat-releasing flow passage structured by combining the main housing member internally forming a plurality of through-holes and the sub housing member, the heat of the cooling fluid can be cooled down.

According to an exemplary embodiment of the invention, the projector is characterized in that the main housing member is provided, at an end, with a plurality of grooves connecting the plurality of through-holes, the heat-releasing flow passage being structured by joining the main housing member and the sub housing member together.

According to this projector, because the heat of the cooling fluid is efficiently conducted to the housing by the heat-releasing flow passage structured combining the main housing member provided, at an end, with a plurality of grooves connecting the plurality of through-holes and the sub housing member, the heat of the cooling fluid can be cooled down.

According to an exemplary embodiment of the invention, the projector is characterized in that a plurality of grooves to connect the through-holes are provided in the sub housing member in positions opposed to the plurality of through-holes of the main housing member. The heat-releasing flow passage is structured by joining the main housing member and the sub housing member together.

According to this projector, because the heat of the cooling fluid is efficiently conducted to the housing by the heat-releasing flow passage structured combining the main housing member and the sub housing member provided with a plurality of grooves connecting the plurality of through-holes in positions opposed to the plurality of through-holes, the heat of the cooling fluid can be cooled down.

According to an exemplary embodiment of the invention, the projector is characterized in that the first housing member includes a top surface and one set of side surfaces opposed to each other of the housing. The heat-releasing flow passage is provided over the top surface and one set of side surfaces of the first housing.

According to this structure, by providing a cooling passage on the top and side surfaces as a location of the first housing member where convection readily occurs in the external air, the cooling effect of natural cooling is enhanced furthermore.

According to an exemplary embodiment of the invention, the projector is characterized in that the first housing member and the heat-releasing flow passage are made of a metal.

According to this structure, by convection of the external air, heat release to the external air is possible through both the first housing member and the heat-release flow passage, thus enhancing the cooling efficiency by natural cooling.

According to an exemplary embodiment of the invention, the projector is characterized in that the light-emitting element is submerged in the cooling fluid. Inlet and outlet passages are provided in two pairs in opposite positions sandwiching the light-emitting element in a plane direction and respectively arranged nearly parallel. The inlet and outlet passages are provided adjacent and in a position greater in distance from the outlet passage to the light emitting element, than a distance from the inlet passage.

According to this structure, because the inlet and outlet passages for cooling fluid are oppositely provided sandwiching the light-emitting element, the cooling fluid is smoothly flowed and discharged while cooling the light-emitting element. Because the inlet and outlet passages are arranged adjacent and the cooling fluid flows around the light-emitting element and is discharged from the outlet passage adjacent the inlet passage, cooling fluid circulation is smoothly effected within the light source.

Furthermore, because the outlet passage is arranged more distant from the light-emitting element than the inlet passage, in the case that, for example, the region of light-emitting element base where the cooling fluid is to flow is circular in shape as viewed in plan, the intersection of the outlet passage at the inner of the outlet port is formed acuter in angle than the other intersection. The cooling fluid is branched by the angular point into a flow to be directly discharged from the outlet passage and a flow rotationally flowing along the periphery of the light-emitting element.

By controlling the flow direction of the cooling fluid in this manner, the cooling fluid is allowed to flow smoothly along the light-emitting element, thus making possible to efficiently cooling down the light-emitting element. Because this makes the temperature distribution uniform on the light-emitting element, thermal stresses are less caused, making possible to reduce or prevent strain occurrence, breakage and slide in the light-emitting element. The light-emitting element can be prevented from deteriorating due to thermal stresses.

Although the cooling fluid is flowed for example by a pump, smooth flow of the cooling fluid satisfactorily requires lower flow rate in obtaining the equivalent cooling effect. This can size-reduce the light source including the pump.

According to an exemplary embodiment of the invention, the projector is characterized in that the light-emitting element is submerged in the cooling fluid. One pair of inlet and outlet passages are provided in positions sandwiching the light-emitting element in a plane direction and respectively arranged parallel, and provided in a position greater in distance from the outlet passage to the light emitting element than a distance from the inlet passage.

According to this structure, despite the light source having a cooling effect slightly reduced, as compared to the above structure having two pairs of inlet and outlet passages, the structure can be simplified and size is reduced by only one pair of inlet and outlet passages.

According to an exemplary embodiment of the invention, the projector is characterized in that the light-emitting element is submerged in the cooling fluid. Inlet and outlet passages are provided oppositely. A light-emitting element is provided in an intersecting position of a straight line connecting the opposed inlet passage and a straight line connecting the opposed outlet passage.

According to this structure, the cooling fluid is allowed to flow toward the light-emitting element. After contacting the light-emitting element, it is branched rectangular by the light-emitting element into a flow along the light-emitting element, and discharged from the outlet passage. Because the cooling fluid is flowed smoothly along the light-emitting element, it is possible to obtain the foregoing cooling effect and uniform temperature distribution. Rather than the foregoing structure providing parallel the outlet and inlet passages, the cross arrangement of inlet and outlet passages can be set greater the distance between the adjacent inlet and outlet passages, thus providing an easy manufacture and size reduction.

According to an exemplary embodiment of the invention, the projector is characterized in that the inlet and outlet passages are provided in plurality in a sectional direction.

According to this structure, because the foregoing inlet and outlet passages are provided in plurality also in the sectional direction, the cooling fluid can be increased in flow rate as compared to the structure where the inlet and outlet passages are provided only in the plane direction, making possible to further enhance cooling effect and temperature uniformity.

According to an exemplary embodiment of the invention, the projector is characterized in that a guide channel for cooling fluid is formed in a surface of the light-emitting element base on which the light-emitting element is firmly fixed.

According to this structure, because these areas are formed, for example, oblique radial or arcuate grooves or projections directed toward the light-emitting element in order to introduce the cooling fluid smoothly and moreover in a flowing direction to the light-emitting element base, the cooling fluid can be freely controlled in a flowing direction. Due to this, the cooling fluid is enhanced in fluidity and circulation, making it possible to enhance the cooling effect furthermore.

According to an exemplary embodiment of the invention, the projector is characterized in that a flow passage for cooling fluid is provided in a peripheral edge of the light-emitting element base, an inlet passage and an outlet passage being provided flowing to the flow passage.

According to this structure, the light-emitting element base, to which heat is conducted from the light-emitting element, can be cooled down. Although the cooling effect is slightly reduced, as compared to the foregoing structure to directly cool the light-emitting element, the pressure of the cooling fluid is not exerted to the light-emitting element because of no direct contact with the cooling fluid. It is possible to reduce the mechanical, chemical property change or the aging change of the light-emitting element related to impurity intrusion, etc.

In the case that the channel is made in a ring form for example, the cooling fluid flows in a manner rounding along this channel around the light-emitting element base, thus making possible to flow the cooling fluid smoothly. Due to this fact, lower flow rate is satisfactory in order to obtain the equivalent cooling effect, which can reduce the size of the light source including the pump.

According to an exemplary embodiment of the invention, the projector is characterized in that inlet and outlet passages are provided in two pairs in opposite positions sandwiching the light-emitting element in a plane direction and respectively arranged nearly parallel. The inlet and outlet passages are provided adjacent and provided at a position greater distance from the outlet passage to the light emitting element than a rectangular distance of from the inlet passage.

According to this structure, because the inlet and outlet passages for cooling fluid flow in the flow passage provided opposite sandwiching the light-emitting element, the cooling fluid is flowed and discharged smoothly. The inlet and outlet passages are arranged adjacent and the cooling fluid is flowed through the flow passage in the periphery of the light-emitting element base to which the light-emitting element is fixed and discharged from the outlet passage adjacent the inlet passage. Thus, cooling fluid circulation is effected smoothly within the light source.

Furthermore, because the outlet passage is arranged more distant from the light-emitting element than the inlet passage, in the case that the region of light-emitting element base where the cooling fluid is to flow is circular in shape as viewed in plan, the intersection of the outlet passage at the inner of the outlet port is formed acuter in angle than the other intersection. The cooling fluid is branched by the angular point into a flow to be directly discharged from the outlet passage and a flow flowing along the periphery of the light-emitting element base.

By controlling the flow direction of the cooling fluid in this manner, the light-emitting element base on which the light-emitting element is firmly fixed is cooled down. Accordingly, thermal stresses are caused less, making it possible to reduce or prevent breakage in the light-emitting element.

Although the cooling fluid is caused to flow by a pump or the like for example, smooth flow of the cooling fluid satisfactorily requires lower flow rate in obtaining the equivalent cooling effect, which can size-reduce the light source including the pump.

According to an exemplary embodiment of the invention, the projector is characterized in that inlet and outlet passages being provided in one pair in opposite positions sandwiching the light-emitting element in a plane direction and respectively arranged parallel, and provided in a position distant greater in a distance from the outlet passage to the light emitting element than a distance from the inlet passage.

According to this structure, despite the light source having a cooling effect slightly reduced as compared to the above structure having two pairs of inlet and outlet passages, the structure can be simplified and size-reduced by the only one pair of inlet and outlet passages.

According to an exemplary embodiment of the invention, the projector is characterized in that inlet and outlet passages are provided oppositely. A light source is provided in an intersecting position of a straight line connecting the opposed inlet passage and a straight line connecting the opposed outlet passage.

According to this structure, the cooling fluid is allowed to flow toward the light-emitting element base and branched into two directions by the light-emitting element base, thus being flowed along the light-emitting element base and discharged from the outlet passage. This makes it possible to obtain the foregoing cooling effect and uniform temperature distribution. Rather than the above structure being provided parallel to the outlet and inlet passages, the cross arrangement of the inlet and outlet passages can be set greater a distance between the adjacent inlet and outlet passages, providing an effect that is easy to manufacture or an effect to reduce size.

According to an exemplary embodiment of the invention, the projector is characterized in that the inlet and outlet passages are provided in a plurality of sectional directions.

According to this structure, because the foregoing inlet and outlet passages are provided in plurality also in the sectional direction, the cooling fluid can be increased in flow rate as compared to the structure where the inlet and outlet passages are provided only in the plane direction, making possible to further enhance cooling effect and temperature uniformity.

According to an exemplary embodiment of the invention, the projector is characterized in that the light-emitting element is submerged in the cooling fluid within a cooling-fluid reservoir chamber having an interior surface, a part of which is provided by a surface of the light-emitting element base provided in the light source. The inlet and outlet passages communicate with the cooling-fluid reservoir chamber such that the flow of the cooling fluid within the cooling-fluid reservoir chamber directed from the inlet to outlet passage can induce a stir flow involving a rotation or branch flow within the cooling-fluid reservoir chamber.

According to this structure, because the flow of the cooling fluid within the reservoir chamber is set to induce a stir flow involving a rotation or branch flow, the cooling fluid flows smoothly, thus making it possible to enhance cooling efficiency.

DETAILED DESCRIPTION OF EXEMPLARY EMBODIMENTS

Hereunder, exemplary embodiments of the present invention will be explained based on the drawings.

Exemplary Embodiment 1

Figure 1:
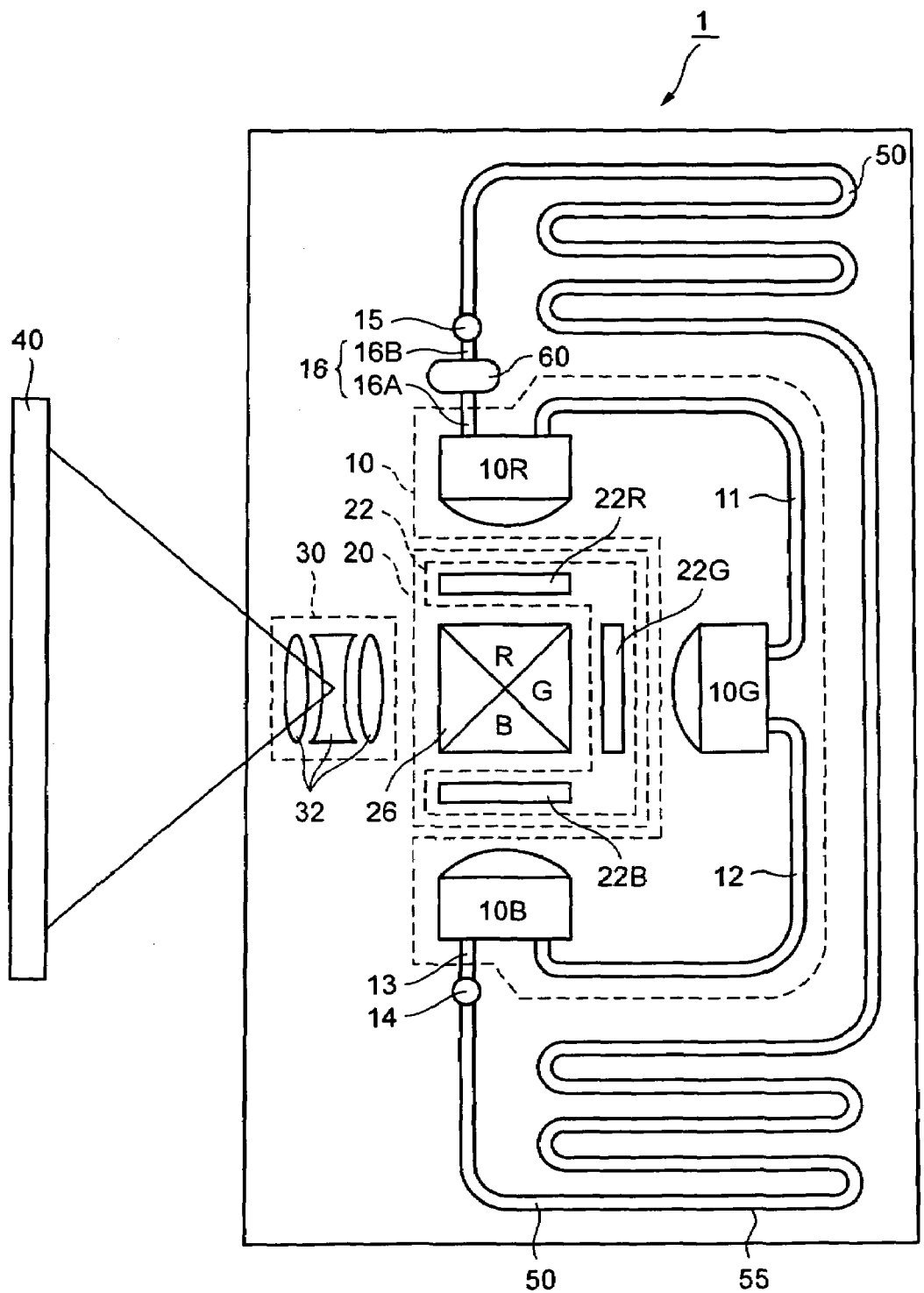
FIG. 1 is a schematic of a projector according to exemplary embodiment 1 of the present invention.

FIG. 1 is a schematic of a projector on which exemplary embodiments of the invention are embodied. The schematic structure of the projector is explained with use of FIG. 1.

The projector 1 has three light sources 10R, 10G, 10B, as a light source 10, for respectively emitting red light (R), green light (G) and blue light (B). The light sources 10R, 10G, 10B, to emit the respective colors of light, employ light-emitting elements as light sources. The light-emitting elements, in the present exemplary embodiment 1, use light-emitting diodes (LEDs). The three light sources 10R, 10G, 10B constituting the light source 10 of exemplary embodiment 1, are configured as separate light sources and connected by flow passages 11, 12 (referred later) into an integral light source 10.

There is provided an optical structure 20 to modulate and combine the respective colors of light emitted from the light source 10. A light valve 22 is employed for modulation which employs a light valve 22R for red, a light valve 22G for green and a light valve 22B for blue, respectively. A dichroic prism 26 is used for combining use. Furthermore, a projection element 30 is provided to magnify and project the light modulated and combined together. The projection element 30 is made up by a projection lens 32.

Now, the operation of the projector is explained.

The three light sources 10R, 10G, 10B constituting the light source 10 emit respective colors of light. The respective colors of light thus emitted enter the light valve 22 constituting the optical structure 20 provided in locations opposed to the respective colors of light.

The light valve 22 has a function to control the image data as a base of image and a function to modulate the respective colors of light. As for the colors of light incident on the light valve 22, red light (R) is modulated by the red light valve 22R, green light (G) is modulated by the green light valve 22G and blue light (B) is modulated by the blue light valve 22B. The modulated colors of light exited from the light valve 22 enter the dichroic prism 26 constituting the optical structure 20.

The dichroic prism 26 has a function to combine the colors of light together. The colors of light incident on the dichroic prism 26 are combined together, to give off a combined beam of light. Then, the combined light enters the projection element 30.

The projection element 30 is made up of a plurality of projection lenses 32, having a function to magnify light for projection use. The combined light incident on the projection element 30 exits with magnification. The magnified combined light thus exited the projection lenses 32 is projected as an image onto a screen 40 provided outside the projector 1. In this manner, the projector 1 is to project an image.

Here, explanation is made on the structure of a flow passage 55 which allows to flow a cooling fluid, to cool down the light sources 10.

The flow passage 55 has a flow passage 11 connecting the three light sources 10R, 10G, 10B in series, a connection flow passage 16A connected to the light source 10R located in the upstream, and a connection flow passage 13 connected to the light source 10B located in the downstream. The connection flow passage 16A is connected to a delivery port of a pump 60 to circulate the cooling fluid. The connection flow passage 13 is connected to one end of a heat-releasing flow passage 50 through a passage repeater 14, the other end of which is connected to a suction port of the pump 60 through a passage repeater 15 and connection flow passage 16B. The heat-releasing flow passage 50 in exemplary embodiment 1 is provided in a route forming a fold of U-formed bends. Here, the connection flow passage 16 and the connection flow passage 13 are connected in a manner continuous with the respective ends of the heat-releasing flow passage 50 through the passage repeater 15 and passage repeater 14.

Now, an explanation is made for the operation of the cooling fluid circulating through the flow passage.

A cooling fluid is filled within the flow passage 55 in series discussed above. In exemplary embodiment 1, the cooling fluid uses ethylene glycol. A pump 60 is used to circulate the cooling fluid in the flow passage 55.

At first, the cooling fluid is caused to flow in one direction by driving the pump 60. In exemplary embodiment 1, a setting is made such that the cooling fluid flows from the pump 60 through the connection flow passage 16A and then enters the red light source 10R.

By driving the pump 60, the cooling fluid flows through the connection flow passage 16A and then flows into the red light source 10R where it receives the heat generated by the red light-emitting diode (LED) as a light-emitting element, and then flows toward the flow passage 11. The exiting cooling fluid flows into the flow passage 11 and then into the green light source 10G. The cooling fluid thus entered receives the heat generated by the green light-emitting diode (LED), and then flows toward the flow passage 12. The exiting cooling fluid passes through the flow passage 12 and into the blue light source 10B. The cooling fluid thus entered receives the heat generated by the blue light-emitting diode (LED), and then flows into the connection flow passage 13.

The cooling fluid receiving the heat at the light source 10B flows into the connection flow passage 13 and flows into the heat-releasing flow passage 50 by way of the passage repeater 14. The heat-releasing flow passage 50 is made as a route having bends, continuing to the passage repeater 15. The material forming the heat-releasing flow passage 50, in exemplary embodiment 1, uses a tube structured of a copper-based metal having a high heat conductivity.

When the cooling fluid flows into the heat-releasing flow passage 50, the heat received at the red light source 10R, green light source 10G and blue light source 10B of the light source 10 is conducted to the heat-releasing flow passage 50. The heat-releasing flow passage 50 thus conducted with heat releases the heat to the external air by convection of the ambient external air. By releasing the heat, the temperature on the heat-releasing flow passage 50 lowers thereby cooling down the cooling fluid flowing through the heat-releasing flow passage 50.

Here, the reason why the heat-releasing flow passage 50 is made as a route formed of U-formed bends is to increase the flow passage length and broaden the surface area contacting with the external air, thereby cooling down the cooling fluid by natural cooling.

The cooling fluid thus cooled down by flowing the heat-releasing flow passage 50 flows in the passage repeater 15, to pass to the connection flow passage 16B connected to the fluid repeater 15, and flow into the pump 60. The cooling fluid thus cooled is flowed through the connection flow passage 16A by the pump 60, to enter the red light source 10R.

By thus circulating the cooling fluid in the flow passage 55, a series of heat recycles take place, making it possible to cool down the light source 10 by natural cooling with utilization of external air convection.

Although, in exemplary embodiment 1, the cooling fluid is passed in order from the light source 10R to the light source 10G and from the light source 10G to the light source 10B, the invention is not limited to this. It is important to provide a flow in such a way as to enhance cooling efficiency by the relationship of arranging the optical systems and the relationship of heat generations at the light sources 10R, 10G, 10B. There is caused a case that flow passages are built in a manner to independently cool down the light sources 10R, 10G, 10B because of the difference in heat generation amount between the light sources 10R, 10G, 10B. In such a case, cooling is made possible by using the flow passage structure of an exemplary aspect of the invention.

Although exemplary embodiment 1 circulates the cooling fluid through the flow passage 55 based on one subsystem, the invention is not limited to this, i.e. in the case there is a sufficient circulating capability available on the pump 60 or the like, circulation can be based on two subsystems thereby enhancing cooling efficiency.

The three light sources 10R, 10G, 10B, constituting the light source 10 in exemplary embodiment 1, were formed as separate light sources and connected by the flow passages 11, 12, etc. into an integral light source 10. However, the invention is not limited to this. A one-bodied light source 10 may be formed from the beginning, to form the flow passages 11, 12 with the members forming the light source 10. By such a structure, further size reduction can be realized for the light source 10.

Although exemplary embodiment 1 uses a copper-based metal having a high heat conductivity for the material of the flow passage 55, the invention is not limited to this but can use a metal, such as an aluminum alloy, having a high heat conductivity.

Figure 2A:
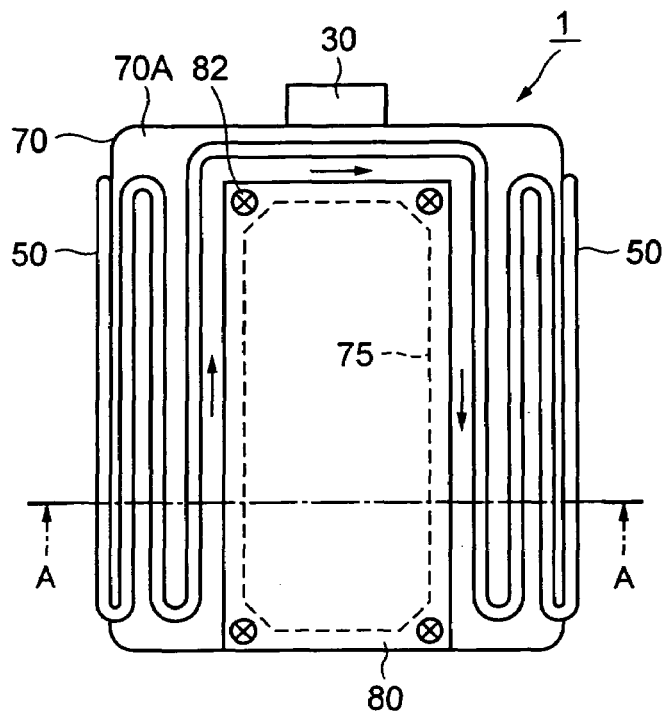
FIGS. 2A-2C show schematics of the projector.
Figure 2B:
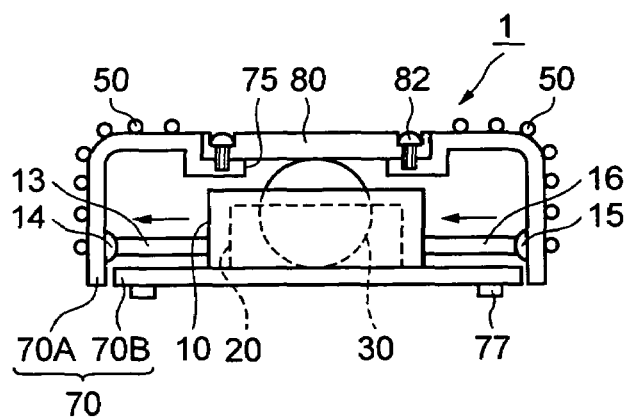

FIG. 2A is a schematic of the projector. FIG. 2B is a schematic of plane A-A in the FIG. A. Using FIGS. 2A-2C, an explanation is made of the construction of the projector according to the exemplary embodiment.

As shown in FIG. 2A, a housing 70 forming an exterior of the projector 1 is structured roughly by two bodies of a first housing member 70A and a second housing member 70B. The first housing member 70A forms the upper side of the projector 1 including a top surface and opposite left-and-right side surfaces.

The second housing member 70B forms the lower side of the projector 1 including an underside (bottom surface) thereof.

The first housing member 70A has an aperture 75 (shown by broken line) substantially rectangular in form and provided in a position opposed to the light source 10 and optical structure 20. In exemplary embodiment 1, because the light source 10 and the optical structure 20 are substantially in a central position of the first housing member 70A, the aperture 75 is also provided substantially in the center of the first housing member 70A. A cover member 80 generally rectangular in form is provided in a form covering the aperture 75 provided generally rectangular in form. The cover member 80 is screwed on the first housing member 70A by screws 82, in order not to be detached therefrom.

The heat-releasing flow passage 50 is provided on the outer surface side of the top and left-and-right surfaces of the first housing member 70A. The heat-releasing flow passage 50 is provided in a route forming a fold of U-formed bends. The heat-releasing flow passage 50 is structured provided around the aperture 75.

As shown in FIG. 2B, the second housing member 70B is provided with a light source 10, an optical structure 20 and a projection element 30. The light source 10 is connected with the connection flow passage 13 and the connection flow passage 16. The connection flow passage 13 is connected with passage repeater 14 to connect to the heat-releasing flow passage 50. Likewise, the connection flow passage 16 is connected with the passage repeater 15 to connect to the heat-releasing flow passage 50. The second housing member 70B is provided with leg members 77 so that the projector 1 can be stably rested on the table.

Now, an explanation is made for the assembly of the projector 1.

Onto the first housing member 70A fixed with the heat-releasing flow passage 50, is fixed by alignment the second housing member 70B fixed with the light source 10 connected with the connection flow passages 13, 16 and passage repeaters 14, 15, the optical structure 20, the projection element 30, the pump 60 and, though not shown, a power source, drive circuit, etc. for driving those. Fixing can be by use of screws and the like. Then, utilizing the aperture 75, the heat-releasing flow passage 50 at its one end is connected to the passage repeater 14 while the other end is connected to the passage repeater 15.

After completing connections, the cover member 80 is set on the aperture 75 and the cover member 80 is fixed on the first housing member 70A. Fixing may be by screws 82. Optical adjustment (e.g. adjustment of optical axis alignment) is made, prior to assembling, by the light source 10, the optical structure 20 and the projection element 30 which have been set up on the second housing member 70B. By the above, mechanical and flow passage assembling is completed.

Now, an explanation is made for the operation of cooling fluid.

By virtue of the pump 60 (see FIG. 1) provided integral with the light source 10, the cooling fluid receives the heat generated within the light sources 10R, 10G, 10B and flows into the connection flow passage 13 in a direction of the arrows shown in FIG. 2B, to flow in the connected heat-releasing flow passage 50 through the passage repeater 14. Then, the cooling fluid flows to the heat-releasing flow passage 50 in a direction of the arrows shown in FIG. 2A by the route folded in plurality through U-formed bends while conducting the reception heat to the heat-releasing flow passage 50. The heat-releasing flow passage 50, because provided on the top and side surfaces of the first housing member 70A, readily causes convection of the external air and efficiently releases the conduction heat to the external air through convection of the external air. By releasing heat, the temperature of the heat-releasing flow passage 50 lowers to thereby cool down the cooling fluid flowing in the heat-releasing flow passage 50 lowered in temperature. The cooling fluid thus cooled flows to the passage repeater 15 and then the connection flow passage 16 in a direction of the arrows shown in FIG. 2B, to return to the pump 60 (see FIG. 1). The cooling fluid cooled is again to enter the light source 10 by the pump 60 (see FIG. 1).

By circulating the cooling fluid in the flow passage 55 thus structured, a series of heat cycles take place, making it possible to cool down the light source 10 by natural cooling.

Figure 2C:
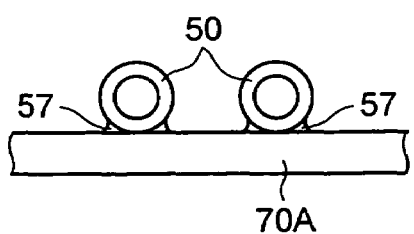

FIG. 2C is a magnifying view of the heat-releasing flow passage 50 provided on the outer surface of the first housing member 70A. The heat-releasing flow passage 50 employs a tube formed of a copper-based metal having high heat conductivity. The first housing member 70A is formed of a magnesium alloy high in heat conductivity but light in weight. Naturally, the first housing member 70A is not limited to a magnesium alloy but can use any suitable metal, such as an aluminum alloy having high heat conductivity. Note that a synthetic resin or other material may be used provided that it has a cooling capability. Thus, the heat-releasing flow passage 50 is fixed on the outer surface of the first housing member 70A by conducting a partial welding 57. Note that fixing is not limited to welding 57 but can use a double-sided tape or an adhesive. Fixing can be simplified by working to provide a mechanism to fix the heat-releasing flow passage 50 on the first housing member 70A, e.g. a somewhat flexible form capable of clamping and fixing the heat-releasing flow passage 50 at its sectional outer shape.

Here, a description is made in detail on the structure and operation of the light source 10.

Figure 3:
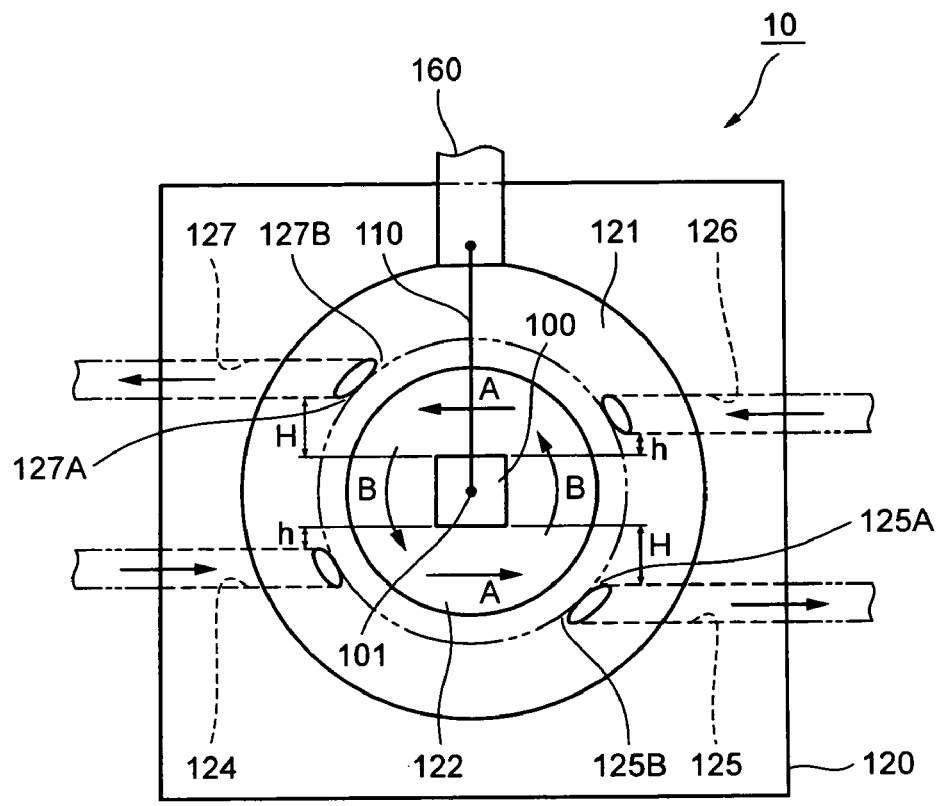
FIG. 3 is a schematic showing a light source.
Figure 4:
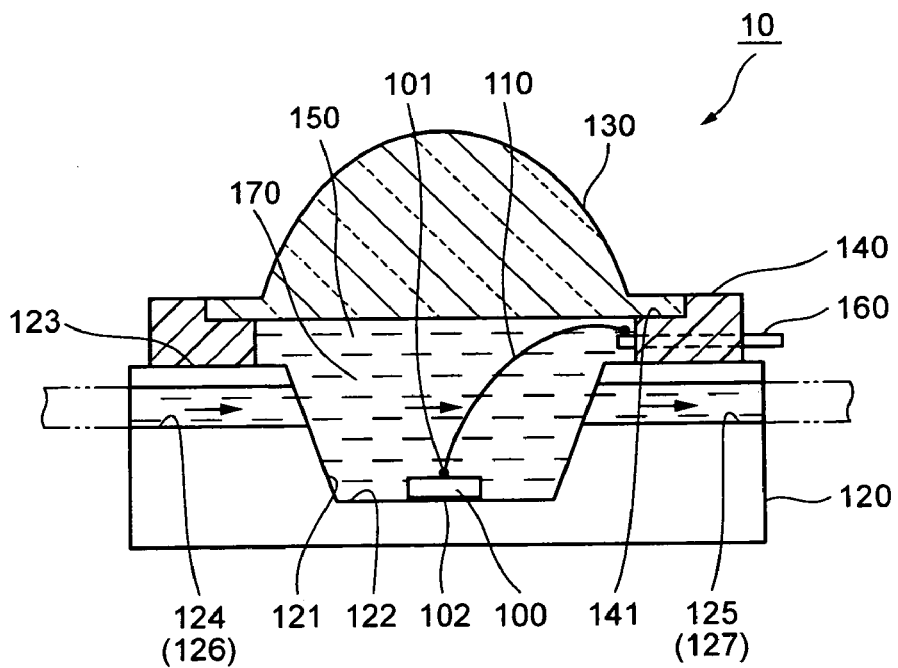
FIG. 4 is a schematic showing the light source.
Figure 5:
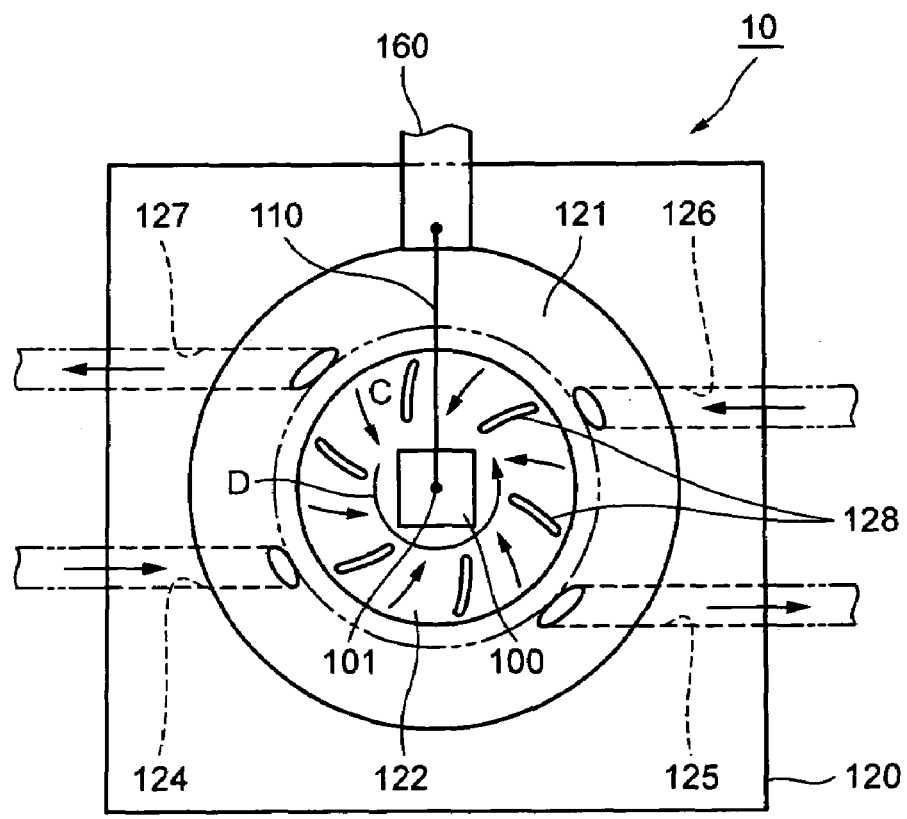
FIG. 5 is a schematic showing the light source.

FIGS. 3 to 5 are schematics illustrating a light source.

FIG. 3 is a schematic of the light source. The lens cap 130 and fixing ring 140 depicted in FIG. 4 are omitted. FIG. 4 is a schematic of the light source. FIG. 5 is a schematic illustrating the detail of a light-emitting element base of the light source. In FIGS. 3 and 4, the light source 10 is constructed with a light-emitting element base 120, an LED chip 100 as a light-emitting element firmly fixed on the light-emitting element base 120, a fixing ring 140 and a lens cap 130.

The LED chip 100 is substantially square in plan form, having a p-electrode 101 on a top surface and an n-electrode 102 on an underside. The n-electrode 102 is firmly fixed at substantially a center of a bottom 122 of a recess formed in the light-emitting element base 120 by an electrically conductive material, such as silver paste, while the p-electrode 101 is connected to a lead 160 through a wire 110.

The light-emitting element base 120, rectangular in outer form, is formed with a recess having a broader opening and narrower bottom, in the center thereof. The light-emitting element base 120 is opened with inlet flow passages 124, 126 and outlet flow passages 125, 127 penetrating from the outer edge to the recess and allowing the cooling fluid 150 to flow. The inlet flow passages 124, 126 and the outlet flow passages 125, 127 have one portion provided at a sectional height facing the top surface of the LED chip 100, referred to later. Those are formed in a direction along one side of the LED chip 100 in plan position.

In FIG. 3, the inlet flow passage 124, 126 and the outlet flow passage 125, 127 are formed parallel respectively. The outlet flow passage 125, 127 are provided in a position that the rectangular distance H to the LED chip 100 from a lengthwise direction is at a distance greater than the distance h of the inlet flow passage 124, 126 to the LED chip 100 from the lengthwise direction. The intersection 125A and 127A, where the outlet flow passage 125, 127 intersects with a slant surface 121 of the recess, is formed acuter in angle than the other intersection 125B, 127B, as viewed in plan.

In FIG. 5, there is formed a pinwheel-like guide channel 128 for cooling fluid 150 directed toward the LED chip 100, in the bottom 122 of the light-emitting element base 120. The guide channel 128 is formed in a groove or protrusion form in the bottom 122. The guide channels 128 may be in a pinwheel form or a straight radial form, which is formed in an area from a vicinity of an outer periphery of the bottom 122 up to a vicinity of a surrounding of the LED chip 100. However, the LED chip 100 may have a surrounding space in a range allowing the cooling fluid 150 to flow round along the LED chip 100.

Although the light-emitting element base 120 can use an aluminum alloy or copper alloy having a high heat conductivity, explanation is made from now on, as an exemplary embodiment, on the case of using an aluminum alloy, small in specific weight and capable of being reduced in weight. This light-emitting element base 120 is processed with a mirror finish, a fine concavo-convex finish (diffuse-reflection finish) or a plating forming a light reflection layer on the surface of the slant surface 121 and bottom 122, in order to efficiently reflect a visible portion of light emitted from the LED chip 100. Although not shown, the light-emitting element base 120 is connected to an external control circuit.

On the upper surface 123 of the light-emitting element base 120, closely fixed is a fixing ring 140 inserted with the lead 160.

The lead 160 is a strip sheet formed of metal and arranged at intermediate of the inlet flow passage 126 and the outlet flow passage 127, to have both ends extending from the fixing ring 140. The inner end is connected to the p-electrode 101 of the LED chip 100 through a wire 110 while the other end, though not shown, is connected to the external control circuit.

On the upper surface 141 of the fixing ring 140, a lens cap 130 is closely fixed. The lens cap 130, the fixing ring 140 and the recess of light-emitting element base 120 form a cooling-fluid reservoir chamber (hereinafter, "a reservoir chamber") 170 into which the cooling fluid 150 is to flow.

The LED chip 100 emits light according to a light-emission signal of from the external control circuit.

Now, explanation is made on flow of the cooling fluid 150 by using FIGS. 3 and 5.

Here, explanation is made on flow taking the light source 10G (see FIG. 1) as an example.

The inlet flow passage 124, 126 is connected to the flow passage 11 (see FIG. 1) while the outlet flow passage 125, 127 is connected to the flow passage 12 (see FIG. 1). The cooling fluid 150 is cooled down in the course of flowing through the heat-releasing flow passage 50 (see FIG. 1) and caused to flow again into the light source 10G at the inlet flow passage 124, 126.

The cooling fluid 150 entered at the inlet flow passage 124, 126 flows in a direction of arrows A within the reservoir chamber 170 of the light-emitting element base 120. Because the inlet flow passage 126 and outlet flow passage 127 and the inlet flow passage 124 and outlet flow passage 125 are deviated in position in a plane direction, the flow is branched at the intersection 125A, 127A of the outlet flow passage 125, 127 with the slant surface 121. Thus, one part is discharged to the outside from the outlet flow passage 125, 127 while one part flows in a direction of arrows B to be discharged from the outlet flow passage 125, 127, thus effecting circulation as noted before.

As explained in FIG. 5, in the case there is formed a guide channel 128, flow is as per the foregoing arrows A and B (see FIG. 3) and further in a direction of arrow C toward the LED chip 100, thus effecting a flow as the arrow D rounding the LED chip 100.

Here, the LED chip 100, as a light source forming the light source 10R, 10G, 10B in exemplary embodiment 1, may be formed by one light-emitting element (LED) or may be formed by light-emitting elements (LEDs) in an arrayed form. Due to this, brightness can be set freely and, moreover, the light source 10R, 10G, 10B can be reduced in size.

As described in detail above, exemplary embodiment 1 provides the following effects.

(1) Because the heat-releasing flow passage 50 is provided on the outer side of the side and top surfaces where convection of the external air readily takes place, the cooling fluid can be cooled down by natural cooling. Cooling efficiency can be enhanced as compared to the case where the heat-releasing flow passage exists within the housing as in the related art. Because the heat-releasing flow passage 50 is made in a route of a fold of U-formed bends to thereby increase the flow passage length, the surface area contacting with the external air can be increased, thus making it possible to cool down the cooling fluid by natural cooling with further efficiency. Accordingly, cooling efficiency can be enhanced furthermore.

(2) Because the use of the pump 60 enables positive flow of the cooling fluid in the flow passage 55, cooling efficiency can be enhanced furthermore. Despite the provision of the aperture 75, the heat-releasing flow passage 50 is provided around the aperture 75. Accordingly, it is possible to keep the effect of enhancing cooling efficiency.

(3) Because of the provision of the aperture 75, flow passage connection is possible to perform even after assembling the first housing member 70A and the second housing member 70B, thus enhancing the efficiency of operation. Because a post-assembling maintenance operation can be made by utilizing the aperture 75 without removing the first housing member 70A and second housing member 70B, there is no need to remove the connection of the flow passage 55, thus enhancing operation efficiency.

(4) Because of no need to remove the first housing member 70A and second housing member 70B, there is eliminated the necessity to use a plastic or silicon flexible tube on the flow passage. Consequently, there is eliminated such a problem as vaporization of cooling fluid out of the tube. In addition, there is eliminated the need of a reserve tank to supplement the vaporized cooling fluid. This provides a great effect contributing to the size reduction of projector 1.

(5) The heat-releasing flow passage 50 is arranged on the outer surface side of the side and top surfaces of the first housing member 70A by use of a tube formed of a metal having a high heat conductivity. Consequently, the heat-releasing flow passage 50 possesses an effect serving also as a fin function, further enhancing cooling efficiency by natural cooling.

(6) The first housing member 70A, because being made of a metal (magnesium alloy) having a high heat conductivity, serves as a heat-radiator plate and further enhances the cooling efficiency by natural cooling.

(7) Although the inlet flow passage 124 and outlet flow passage 125 for cooling fluid 150 and the inlet flow passage 126 and outlet flow passage 127 are arranged opposite sandwiching the light-emitting element, the outlet flow passage 125, 127 is outer in the distance from the LED chip 100, to branch the flow at the intersection 125A, 127A of the outlet flow passage 125, 127. Because the cooling fluid 150 flows in a manner rounding the chip 100, the cooling fluid is discharged smoothly while cooling down the light-emitting element.

(8) The inlet flow passage 126 and outlet flow passage 125 and the inlet flow passage 124 and outlet flow passage 127 are arranged adjacent. Because the cooling fluid 150 flows around and cools down the LED chip 100 and is discharged at the outlet flow passage adjacent the inlet flow passage, cooling fluid circulation is smooth within the light source 10.

(9) By thus controlling the flow direction of cooling fluid, the cooling fluid is caused to smoothly flow along the LED chip 100, thus making it possible to efficiently cool down the LED chip 100. Because this makes the temperature distribution uniform on the LED chip 100, thermal stresses are caused less. The LED chip 100 can be prevented from deteriorating due to thermal stresses.

(10) Although the cooling fluid is caused to flow by the pump 60, smooth flow of the cooling fluid requires lower flow rate to obtain the equivalent cooling effect. The pump 60 can be reduced in power, which makes it possible to size-reduce the light source 10 including the pump 60.

Exemplary Embodiment 2

Figure 6:
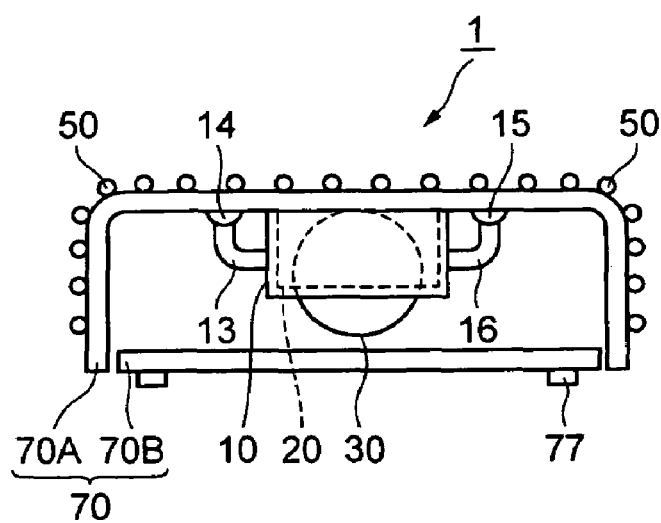
FIG. 6 is a schematic of a projector according to exemplary embodiment 2 of the invention.

FIG. 6 is a schematic of a projector on which an exemplary embodiment of the invention is embodied. Exemplary embodiment 2 is explained with use of FIG. 6.

In FIG. 6, a first housing member 70A is in a structure built with all the members 10, 20, 30 constituting an optical system as well as the members 13, 14, 15, 16, 50 constituting a flow passage. Specifically, the first housing member 70A is provided with a light source 10, optical structure 20 and projection element 30 constituting the optical system, and with a heat-releasing flow passage 50, connection flow passages 13, 16 connected to the light source 10 and passage repeaters 14, 15 constituting the flow passage.

In assembling, the light source 10 connected with the connection flow passages 13, 16 and passage repeater 14, 15 is fixed onto the first housing member 70A fixed with the heat-releasing flow passage 50. Here, one end of the heat-releasing flow passage 50 is connected to the passage repeater 14 and the other end to the passage repeater 15. This provides a structure of flow passage 55. Then, the optical structure 20 and the projection element 30 are fixed to the first housing member 70A. Next, the second housing member 70B and the first housing member 70A are fixed together. Fixing is by use of screws or the like. This completes assembling.

According to Exemplary embodiment 2, the following effects are obtained.

(1) Because the first housing member 70A is attached with the light source 10 and the heat-releasing flow passage 50, connection can be made between the connection flow passages 13, 16 on the side of first housing member 70A and light source 10 and the heat-releasing flow passage 50 by use of the passage repeaters 14, 15. Consequently, because of no need of flow passage connecting operation after assembling the first housing member 70A and second housing member 70B, the operation efficiency of flow passage connection can be enhanced furthermore. Besides this effect, because the optical structure 20 and the projection element 30 are assembled on the first housing member 70A, optical adjustment, such as optical axis adjustment, can be performed with reference to the first housing member 70A, making it possible to enhance the operation efficiency of optical adjustment furthermore.

(2) Because an aperture 75 is not provided in the first housing member 70A, the heat-releasing flow passage 50 can be provided over the entire top surface of the first housing member 70A, making it possible to further enhance the cooling efficiency. A maintenance operation in the absence of aperture 75 requires removing the first housing member 70A and the second housing member 70B. However, because the optical system's members 10, 20, 30 and the flow passage-related members 13, 14, 15, 16, 50 are all provided on the side of first housing member 70A, there is no necessity of removing the connection of the flow passage 55, thus facilitating the operation of housing removal.

Although exemplary embodiment 2 is structured that an aperture 75 is not provided in the first housing member 70A, it is possible to adopt a structure that an aperture 75 is provided and covered by a cover member 80. In this case, the heat-releasing flow passage 50 may be provided around the aperture 75 similar to exemplary embodiment 1. Due to this, the utilization of the aperture 75 enables a maintenance operation after assembling, without removing the first housing member 70A and second housing member 70B, thus enhancing operation efficiency.

Exemplary Embodiment 3

Figure 7:
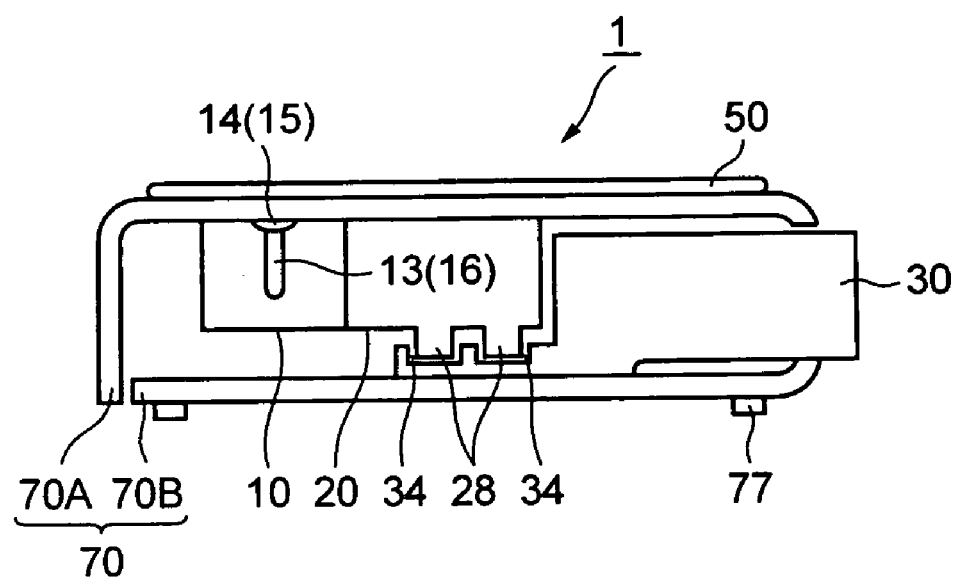
FIG. 7 is a schematic of a projector according to exemplary embodiment 3 of the invention.

FIG. 7 is a schematic of a projector on which an exemplary aspect of the invention is embodied. Exemplary embodiment 3 is explained using FIG. 7.

In FIG. 7, a first housing member 70A is provided with a heat-releasing flow passage 50 constituting a flow passage, connection flow passages 13, 16 connected to a light source 10, passage repeater 14, 15, and a light source 10 and optical structure 20 constituting an optical system. A second housing member 70B is provided with a projection element 30 constituted for the optical system. Here, because the members 13, 14, 15, 16, 50 constituting the flow passage are all provided on the first housing member 70A, flow passage connection can be carried out in a state merely assembled with the first housing member 70A.

Positioning convexes 28 are provided at two locations on the optical structure 20. Positioning concaves 34 are provided at two locations on the projection element 30. In the case to assemble the first housing member 70A and the second housing member 70B together, by engaging the two convexes 28 provided on the optical structure 20 and the two concaves 34 provided on the projection element 30 with each other, the first housing member 70A and the second housing member 70B are placed in position such that the optical structure 20 and the projection element 30 are aligned in optical axis.

According to exemplary embodiment 3, the following effects are obtained.

(1) During assembling, positioning can be made for the light source 10 and optical structure 20 assembled on the first housing member 70A and the projection element 30 assembled on the second housing member 70B by the use of the convex 28 and concave 34 as a positioning mechanism. Consequently, despite the optical system separated as the first housing member 70A and the second housing member 70B, assembling is possible while keeping the positional relationship optically adjusted, such as at the optical axis.

Exemplary Embodiment 4

Figure 8:
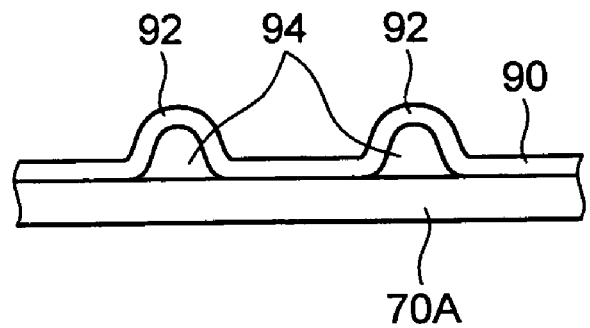
FIG. 8 is a schematic of a heat-releasing flow passage according to exemplary embodiment 4 of the invention.

FIG. 8 is a schematic concerning the structure of the heat-releasing flow passage of an exemplary aspect of the invention. Exemplary embodiment 4 is explained with using FIG. 8.

In FIG. 8, one sheet member 90 is fixed on the outer surface side of the first housing member 70A. Protrusions 92, generally semi-arcuate in section, are formed on the member 90, to configure spaces 94 generally semicircular in section between the protrusions 92 and the first housing member 70A. A cooling fluid is to flow through the spaces 94.

The member 90 uses a copper-based metal having a higher heat conductivity. The first housing member 70A, high in heat conductivity, is formed of a magnesium alloy light in weight. Incidentally, the material of the member 90 structuring the heat-releasing flow passage 50 is not limited to a copper-based alloy but can use such a metal as an aluminum alloy having a high heat conductivity. The first housing member 70A is not limited to a magnesium alloy but can use such a metal as an aluminum alloy having a high heat conductivity.

As a method of forming the spaces 94, the member 90 is pressed with a metal die to form protrusions 92. The member 90 and the protrusions 92 are formed fixed on the first housing member by welding or the like, whereby spaces 94 can be formed. As another method, the member 90 may be previously fixed except at the portions to form spaces 94 on the first housing member 70A so that forming can be done by a shaping of feeding a high-pressure fluid to the portions to be formed into spaces 94.

According to exemplary embodiment 4, the following effect is obtained.

(1) The effect is obtained similar to the description in exemplary embodiment 1 that the cooling fluid is to be cooled by releasing heat to the external air from the protrusions 92. The further effect lies in that, because of the structure, the first housing member 70A and the heat-releasing flow passage 50 are formed integral so that cooling fluid is in direct contact with the first housing member 70A. Heat is directly conducted to the first housing member 70A where heat can be released by the action of the first housing member 70A as a heat-releasing plate. Thus, making it possible to further enhance cooling efficiency.

Figure 14:
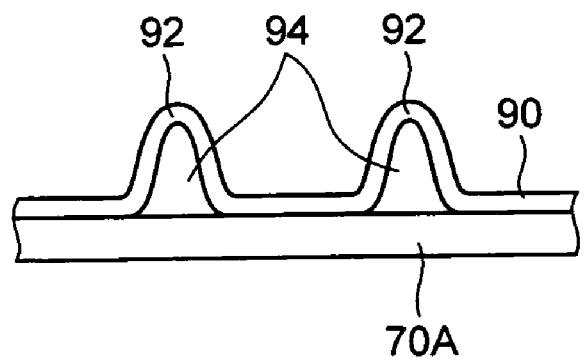
FIG. 14 is a schematic showing a modification of the heat-releasing flow passage.

Although exemplary embodiment 4 forms, as a heat-releasing flow passage 50, the spaces 94 generally semicircular in section between the protrusions 92 and the first housing member 70A, the space 94 may be practiced in a form expanded vertically of the first housing member 70A, as shown in FIG. 14, for example. This increases the surface area of the protrusions 92 as a heat-releasing flow passage 50, to generate the effect similar to the fin and further enhance heat-releasing efficiency furthermore. As a result, the cooling effect of cooling fluid is enhanced furthermore.

The structure may be such that the member 90 is fixed on the inner surface side of the first housing member 70A, to form spaces 94. In this case, the heat of the cooling fluid can be released from the outer surface side of the first housing member 70A by the action of the first housing member 70A as a heat-releasing plate, thus cooling down the cooling fluid and keeping cooling efficiency.

Exemplary Embodiment 5

Figure 9:
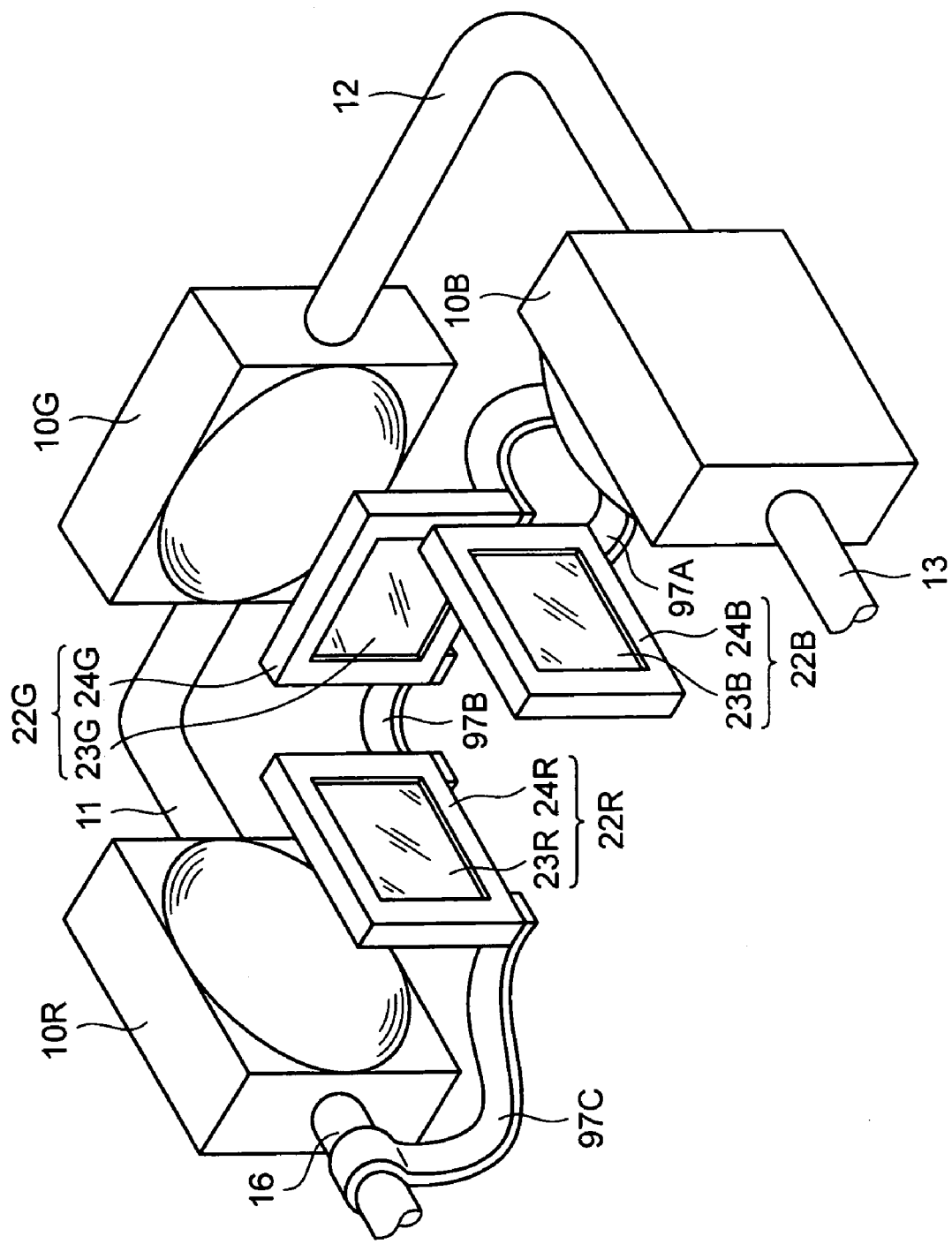
FIG. 9 is a schematic of a light source and optical structure according to exemplary embodiment 5 of the invention.

FIG. 9 is a schematic of a light source and optical structure in the case of using a heat-conductive element of an exemplary aspect of the invention. Exemplary embodiment 5 is explained using FIG. 9. Note that the dichroic prism 26 is omitted in FIG. 9.

In FIG. 9, a light valve 22R is structured by a liquid-crystal panel 23R and a frame 24R, a light valve 22G by a liquid-crystal panel 23G and a frame 24G and a light valve 22B by a liquid-crystal panel 23B and a frame 24B.

Here, explanation is made on the effect of the emission light emitted from the light source 10, by taking the light source 10R as an example.

The emission light emitted from the light source 10R, optically, is to be modulated by the opposed light valve 22R. However, it thermally heats up the opposed light valve 22R. Specifically, temperature rises on the liquid-crystal panel 23R and the plastic or metal frame 24R fixing the liquid crystal panel 23R that constitute the light valve 22R, due to the emission light from the light source 10R. Thus, the heat of the light valve 22R is to be cooled down by heat released to the external air within the housing. However, since cooling efficiency is not so high and the characteristic of liquid-crystal panel 23R is under influence of temperature, modulation function and image-data control function is lowered by a temperature rise on the liquid-crystal panel 23R. Similar problems occur also on the light valves 22G, 22B.

Consequently, exemplary embodiment 5 is structured so that the light valve 22B and the light valve 22G are connected by a heat conductive member 97A, the light valve 22G and the light valve 22R are connected by a heat conductive member 97B, and the light valve 22R is connected to a connection flow passage 16 connected to the light source 10R by the heat conductive member 97C, as shown in FIG. 9. Specifically, between the light valves 22B, 22G, 22R, the heat conductive members 97A, 97B are respectively connected to the frames 24B, 24G, 24R. In exemplary embodiment 5, the heat conductive member 97 refers collectively to 97A, 97B, 97C.

This connection allows for conducting the heat of the light valve 22 to the connection flow passage 16 through the connection member 97, thus cooling down the light valve 22.

The reason for connecting the heat conductive member 97C to the connection flow passage 16 is because, in exemplary embodiment 1, the temperature of the connection flow passage 16 is lower in temperature as compared to the temperature of the light valve 22. In the case of connecting the connection flow passage 13, 16 and the light valve 22 by the heat conductive member 97, comparison is made between the temperature of the light valve 22 and the temperature of the connection flow passage 13, 16, to make a connection to the connection flow passage lower in temperature than the light valve 22.

In exemplary embodiment 5, a heat conductive tape higher in heat conductive efficiency is used as the heat conductive member 97. However, the heat conductive member 97 is not limited to this but can adopt a structure so that a cushion member higher in heat conductive efficiency is pressure-contacted and fixed between the light valve 22 and the connection flow passage 13 or connection flow passage 16.

(1) By virtue of the heat conductive member 97, the light valve 22 is effectively cooled in temperature. The function in nature of the light valve 22 can be stably exhibited without encountering a lower modulation function and image-data control function of the liquid-crystal panels 23R, 23G, 23B constituting the light valve.

Exemplary Embodiment 6

Figure 10:
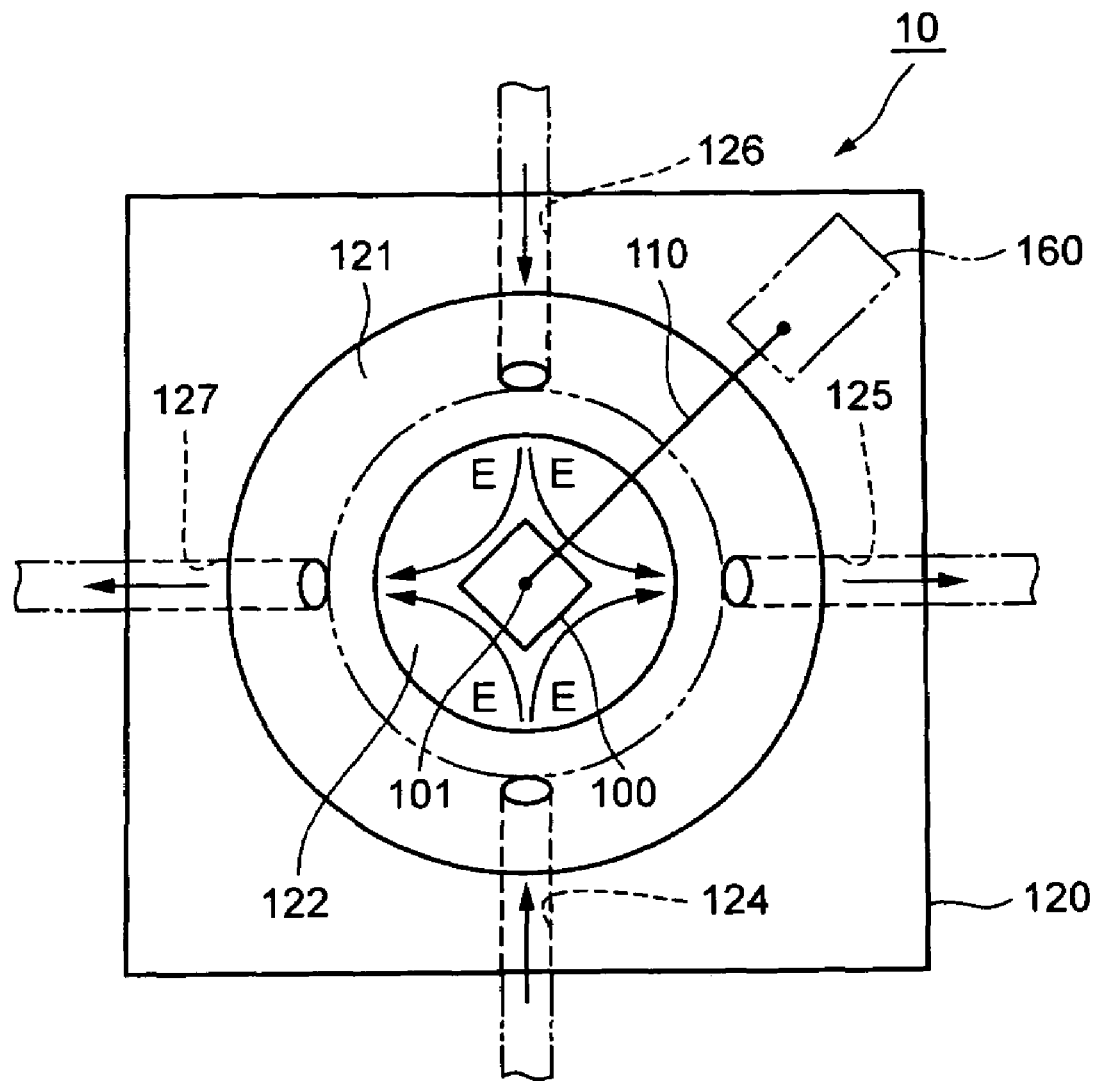
FIG. 10 is a schematic of a light source according to exemplary embodiment 6 of the invention.

FIG. 10 is a schematic illustrating exemplary embodiment 6. Exemplary embodiment 1 has a light source 10 structure that the inlet and outlet flow passages are provided parallel with the LED chip 100 whereas exemplary embodiment 6 is practiced with a structure that inlet and outlet flow passages are opposed to the LED chip 100 as shown in FIG. 10. Exemplary embodiment 7 is explained with using FIG. 10. Note that the sectional relationship in exemplary embodiment 6 is similar to FIG. 4 and hence explanation is omitted.

In FIG. 10, the LED chip 100 is generally square in plan form, having a p-electrode 101 on the top surface and an n-electrode 102 on the underside 102. The n-electrode 102 is firmly fixed nearly at a bottom 122 center of a reservoir chamber 170 formed in a light-emitting element base 120 by a conductive material, such as a silver paste, while the p-electrode is connected to a lead 160 by a wire 110.

The light-emitting element base 120, generally square in outer form, is formed at a center with a reservoir chamber 170 having a broader opening and narrower bottom. The light-emitting element base 120 is opened with inlet flow passages 124, 126 and outlet flow passages 125, 127 penetrating from the outer edge to the reservoir chamber 170 and allowing to flow the cooling fluid 150. The inlet flow passages 124, 126 and the outlet flow passages 125, 127 are provided at a sectional height facing the top surface of the LED chip 100. In plan position, the inlet flow passages 124 and 126 and the outlet flow passages 125 and 127 are formed opposite to each other and directed toward the corner of the LED chip 100.

In a bottom 122 surface, a groove- or protrusion-like guide channel may be provided for cooling fluid 150, similar to exemplary embodiment 1. In this case, the guide channel is formed along a direction of arrow E in the figure. In exemplary embodiment 6, the connection structure of the light source 10 to the external is similar to the structure described in exemplary embodiment 1 and hence explanation is omitted.

The cooling fluid 150 entered from the inlet flow passages 124, 126 flows toward the corner of the LED chip 100, and branched at the corner into two directions (arrow E, in the figure). It is allowed to flow along the sides of the LED chip 100 and discharged to the outlet flow passages 125, 127.

Accordingly, according to exemplary embodiment 6, the cooling fluid 150 flows toward the corner of the LED chip 100 and branches at the corner in two directions, thus being flowed along the sides of the LED chip 100 and discharged from the outlet flow passage. Thus, it is possible to obtain a cooling effect and uniform temperature distribution similar to the foregoing exemplary embodiment 1. Rather than the structure providing the inlet flow passage 124, 126 and the outlet flow passage 125, 127 parallel in exemplary embodiment 1, the cross arrangement of inlet flow passages 124, 126 and outlet flow passages 125, 127 can be set greater the adjacent distance between the inlet flow passage 124 and the outlet flow passage 125, 127 and between the inlet flow passage 124 and the outlet flow passage 125, 127. There is also an effect of ease in manufacture and reduction in size.

Although not shown, it is possible to contemplate, from exemplary embodiment 6 structure, a structure having only one pair of outlet and inlet flow passages. In this case, the outlet flow passage 127 can be provided in an opposite position to the inlet flow passage 126 (providing an outlet flow passage 127 in the position of the inlet flow passage 124).

With this structure, as compared to the case provided with two pairs of inlet and outlet flow passages shown in exemplary embodiment 6, nearly the equivalent effect can be obtained despite the light source 10 is somewhat reduced in cooling effect.

Because of sole one provision of the inlet flow passage 126 and outlet flow passage 127, the light source 10 can be simplified in structure and reduced in size.

Exemplary Embodiment 7

Figure 11:
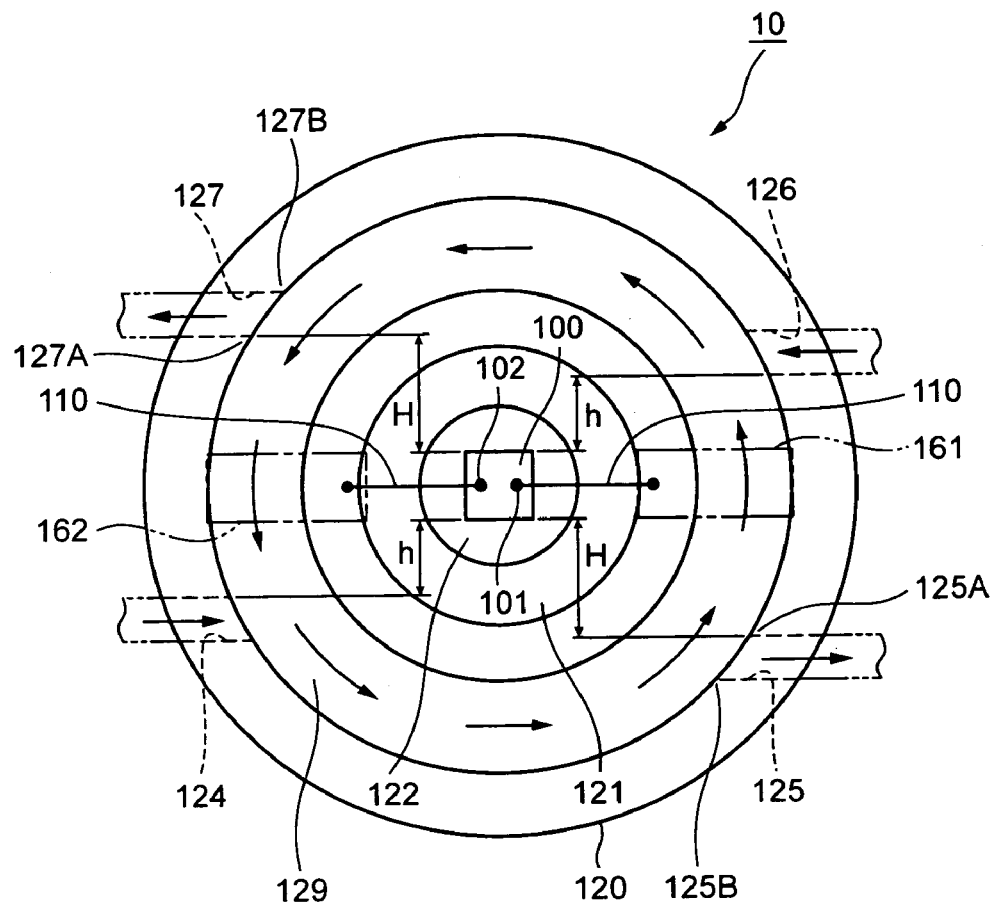
FIG. 11 is a schematic of a light source according to exemplary embodiment 7 of the invention.
Figure 12:
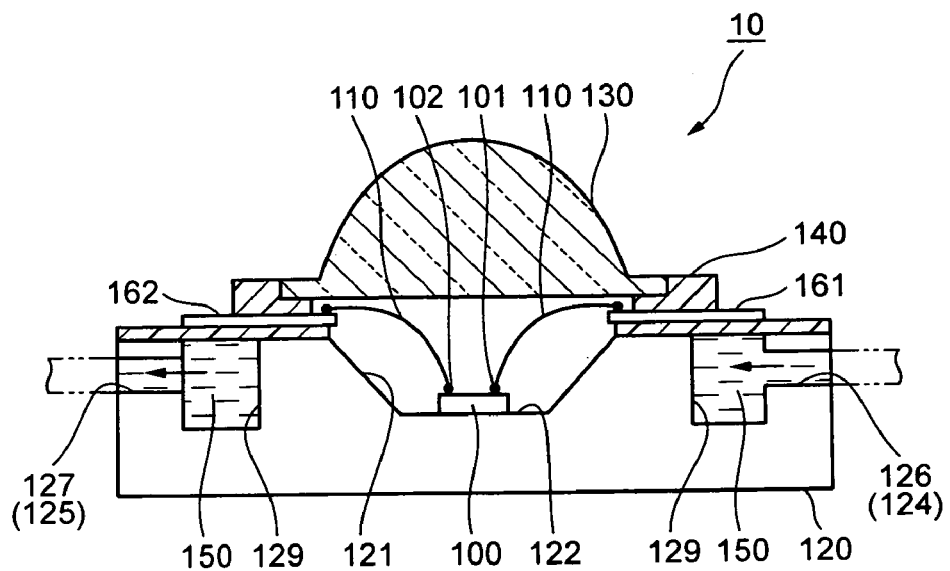
FIG. 12 is a schematic showing the light source.

FIG. 11 is a schematic showing a light source of exemplary embodiment 7. FIG. 12 is a schematic showing a light source of exemplary embodiment 7. In the foregoing exemplary embodiments 1 and 6, the light source 10 has a structure that the LED chip 100 is submerged in the cooling fluid 150 whereas, in exemplary embodiment 7, the LED chip 100 is not submerged in the cooling fluid 150 but practiced with a structure that a flow passage for cooling fluid 150 is provided in a peripheral edge of the light-emitting element base 120. Exemplary embodiment 7 is explained with using FIGS. 11 and 12.

In FIG. 11, omitted are the fixing ring 140 and the lens cap 130. In FIGS. 11 and 12, the LED chip 100 is substantially square in plan form, having a p-electrode 101 and n-electrode 102 on the top surface. The underside is firmly fixed at a nearly center of a recess bottom 122 formed in the light-emitting element base 120. The p-electrode 101 and the n-electrode 102 are respectively connected to leads 161, 162 through wires 110.

The light-emitting element base 120, circular cylinder in outer form, is formed with a recess having a broader opening and narrower bottom in the center thereof, and with a ring-formed flow passage 129 for cooling fluid 150 in an outer edge thereof. The flow passage 129 has a bottom formed deeper than the bottom 122 plane of the light-emitting element base 120 and an upper region made open. There are opened the flow passage 129 and the inlet flow passages 124, 126 and outlet flow passages 125, 127 penetrating the light-emitting element base 120 from the outer periphery.

The inlet passages 124, 126 and the outlet passages 125, 127 are formed parallel, respectively. The outlet flow passage 125, 127 is provided in a position distant greater in the distance H to the LED chip 100 from a lengthwise direction than the distance h to the LED chip 100 from the lengthwise direction. The intersections 125A and 127A, at which the outlet flow passages 125, 127 intersect with the flow passage 129, are formed acuter in angle than the other intersections 125B, 127B as viewed in the plan.

The upper opening of the flow passage 129 is firmly fixed by a fixing ring 140 over the light-emitting element base 120 through the means of an adhesive or the like, thus being hermetically sealed.

In FIG. 12, the fixing ring 140 is formed in a ring form having two-staged steps in a sectional direction, to have an outer periphery made nearly in the same form as the outer periphery of the light-emitting element base 120, thus being formed of a synthetic resin. This fixing ring 140 is insert-molded and closely fixed with leads 161, 162 having exposed both ends. The inner end of the lead 161 is connected to the p-electrode 101 of the LED chip 100 by a wire 110 while the outer end is connected to a not-shown external control circuit. The inner end of the lead 162 is connected to the n-electrode 102 of the LED chip 100 by a wire 110 while the outer end is connected to the not-shown external control circuit.

A lens cap 130 is closely fixed on the upper surface of the fixing ring 140, to form a space to accommodate the LED chip 100 by these light-emitting element base 120, fixing ring 140 and lens cap 130.

The LED chip 100 emits light by obtaining a light-emission signal from the external control circuit.

The light-emitting element base 120, can be formed using an aluminum alloy or copper alloy having a high heat conductivity but may employ an aluminum alloy small in specific gravity and capable of reducing the weight. This light-emitting element base 120 is processed with a mirror finish, a fine concavo-convex finish (diffuse-reflection finish) or a plating forming a light reflection layer on the surface of the slant surface 121 and bottom 122, in order to efficiently reflect a visible portion of light emitted from the LED chip 100.

Here, explanation is briefly made on the flow in the case the light source 10 is a light source 10G (see FIG. 1). The inlet flow passages 124, 126 are connected with the flow passage 11 (see FIG. 1) while the outlet flow passages 125, 127 are connected to the flow passage 12 (see FIG. 1). The cooling fluid 150 is cooled down in the flow process through the heat-releasing flow passage 50 (see FIG. 1) and allowed again to flow from the inlet flow passage 124, 126 into the light source 10G.

The cooling fluid 150 entered from the inlet flow passage 124, 126 flows along a wall of the flow passage 129 in a manner of the arrow shown in FIG. 11. At the intersection 125A, 127A of the outlet flow passage 125, 127, it is branched into a discharge direction and a direction along the flow passage 129. In this manner, the cooling fluid 150 is allowed to flow smoothly in the flow passage.

Accordingly, according to exemplary embodiment 7, as compared to the structure for directly cooling down the LED chip 100 by the cooling fluid 150 as described in the foregoing exemplary embodiments 1 and 6, cooling efficiency is slightly reduced. However, by transferring the heat transferred to the light-emitting element base 120 having a high heat conductivity to the fluid through forcible flowing of the cooling fluid, sufficient cooling effect can be obtained.

Because the outlet flow passage 125, 127 lies outer than the inlet flow passage 124, 126 with respect to the LED chip 100, the intersection 125A, 127A with the flow passage 129 is acuter in angle than the other intersection 125B, 127B. At the intersection 125A, 127A, the cooling fluid 150 is branched to flow smoothly along the wall within the flow passage 129. Consequently, cooling efficiency is enhanced, thus making it possible to reduce the power of the pump 60 (see FIG. 1) and to size-reduce the light source including the pump 60.

Furthermore, because the cooling fluid 150 is not in direct contact with the LED chip 100, it is possible to decrease the influence due to the cooling fluid 150, such as wear of the LED chip 100, characteristic change of the LED chip 100 due to intrusion of impurities, and air bubbles that may occur in the cooling fluid 150. Thus favorable performance can be maintained over a long term.

Although not shown, although exemplary embodiment 7 was provided with two pairs of inlet and outlet flow passages, it is possible to contemplate a light source having one pair of inlet and outlet flow passages. Specifically, a light source 10 structured with an inlet flow passage 124 and an outlet passage 125 by omitting the outlet flow passage 126 and the outlet flow passage 127. In this case, the structure can be only with the inlet flow passage 126 and the outlet flow passage 127, having the same effect.

In this case, although cooling efficiency is somewhat lower than the structure having two pairs of inlet and outlet flow passages, there is an effect that structure can be made simple and size can be reduced.

Exemplary Embodiment 8

Figure 15A:
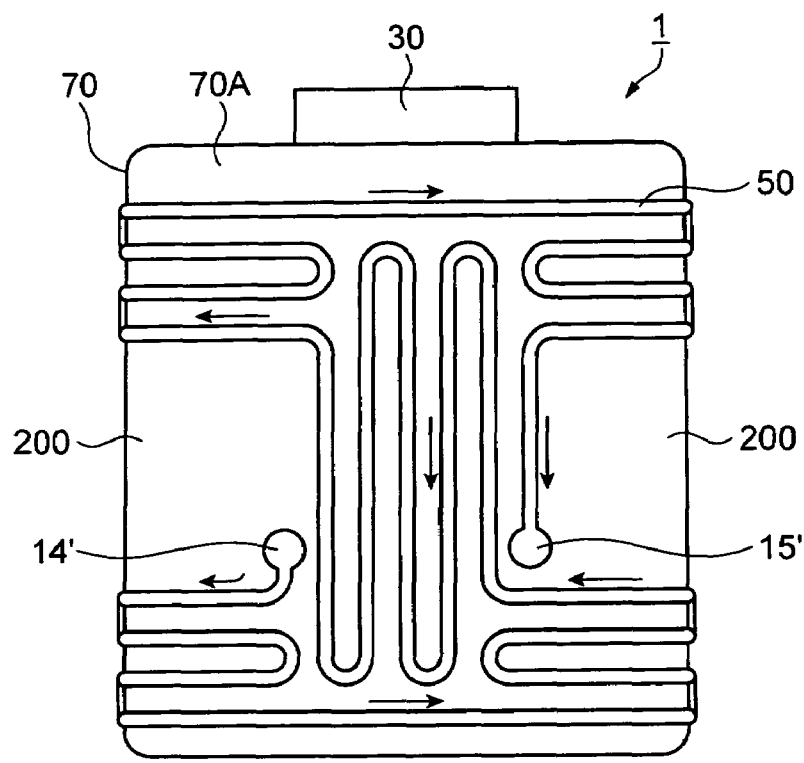
FIGS. 15A and 15B show schematics of a projector according to exemplary embodiment 8 of the invention.
Figure 15B:
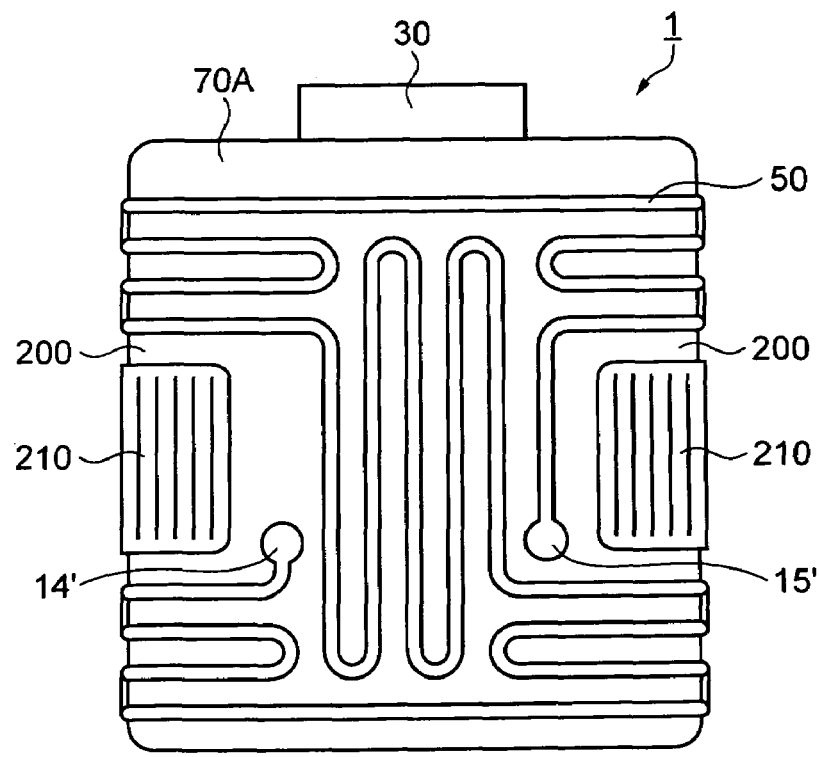

FIGS. 15A and 15B are schematics of another projector on which an exemplary aspect of the invention is embodied. FIG. 15A is a schematic showing that a grip is provided on the projector. The same figure B is a schematic showing that a support member is provided on the grip of the projector. Exemplary embodiment 8 is explained with using FIG. 15.

In FIG. 15A, on the exterior top surface of a first housing member 70A of a projector 1, there is arranged a heat-releasing flow passage 50 having a flow passage arrangement different from a flow passage arrangement of a heat-releasing flow passage 50 shown in FIG. 2A. The structure, etc. of the heat-releasing flow passage 50 is similar to FIG. 2A. There is provided a grip 200 for the user to hold the projector 1 and move it. The grip 200 is provided in an area extending from nearly a center of top-surface left and right ends of the first housing member 70A to the thickness direction (toward deeper: toward left and right surface, in the figure) and to left and right ends of the second housing member 70B. The heat-releasing flow passage 50 is arranged around the grip 200. Due to this, the user can grasp the grips 200 provided at the left and right ends, in a thickness direction of the projector 1.

In FIG. 15B, the projector 1 has grip members 210 secured on the grips 200, in a form covering the grips 200 provided in FIG. 15A. The grip member 210 is formed of a synthetic resin material, a rubber-based material, or the like, having a smaller heat conductivity as compared to the metal material, so that less heat of the projector 1 can conduct to the grip member 210. The grip member 210 is formed with a concavo-convex form in the outer surface of the grip member 210, as a prevention against slide when the user grasps the grip members 210.

The references 14', 15' shown in FIG. 15 denote the points of heat-releasing flow passage 50 corresponding to the passage repeater 14 and passage repeater 15 shown in FIG. 2B. The arrow shown in the figure indicates a flow direction of the cooling fluid flowing the heat-releasing flow passage 50. The cooling fluid, flowed from the flow passage of within the housing 70 to the passage repeater 14', flows the heat-releasing flow passage 50 as shown by the arrow into the passage repeater 15', thus flowing into the flow passage of within the housing 70.

Exemplary embodiment 8 obtains the following effects.

(1) Because the grips 200 are provided on the housing 70 and further the heat-releasing flow passage 50 is provided around the grips 200, the user can move the projector 1 by grasping the grips 200. At the same time, natural cooling utilizing flow of the external air is made possible by the heat-releasing flow passage 50.

(2) Because the grip 200 has the grip member 210, the heat of the housing 70 is less conducted, the user is allowed to move the projector by grasping the grip member 210. At the same time, natural cooling utilizing flow of the external air is made possible by the heat-releasing flow passage.

The grips 200 shown in FIG. 15A are provided at two locations in the areas of from nearly the center in the left and right ends on the top surface of the first housing member 70A to the left and right surfaces. Besides, the grip 200 can be provided in either of the left or the right. It can be provided opposite to the projection element 30 (the lower in the figure) of the first housing member 70A. The position and size of the grip 200 can be determined by taking account of the arrangement relationship of the heat-releasing flow passage 50 and easiness to grip.

In order to indicate the presence of the grip 200 to the user, the grip 200 can be colored by printing or so. Due to this, the user is allowed to readily recognize the grip 200 so that he/she can move the projector 1 by grasping the grip 200 without touching the heat-releasing flow passage 50 being heated.

Likewise, in order to indicate the presence of the grip member 210 to the user, the grip member 210 can be colored by printing or the color of forming material itself. Due to this, the user is allowed to readily recognize the grip member 210 so that he/she can move the projector 1 by grasping the grip members 210 without touching the heat-releasing flow passage 50 being heated.

In the grip 200 shown in FIG. 15A, a maintenance aperture (not shown) can be provided similar to the showing in FIG. 2A. In such a case, a cover member covering the aperture can be provided so that the aperture, after maintenance, can be covered and fixed with the cover member by screws. This enables to perform maintenance at the inside of the projector 1 without removing the first housing member 70A, the second housing member 70B and the heat-releasing flow passage 50. After maintenance, by fixing the cover member by screws, the projector 1 can be moved by grasping the grips 200.

Although not shown, the grip member 210 shown in FIG. 15B can be provided over the heat-releasing flow passage, in a form covering the heat-releasing flow passage 50. Because this can increase the passage length of the heat-releasing flow passage 50, the heat release area is increased to thereby making possible to enhance heat-releasing efficiency. The projector 1 can be moved by grasping the grip members 210.

Exemplary Embodiment 9

Figure 16:
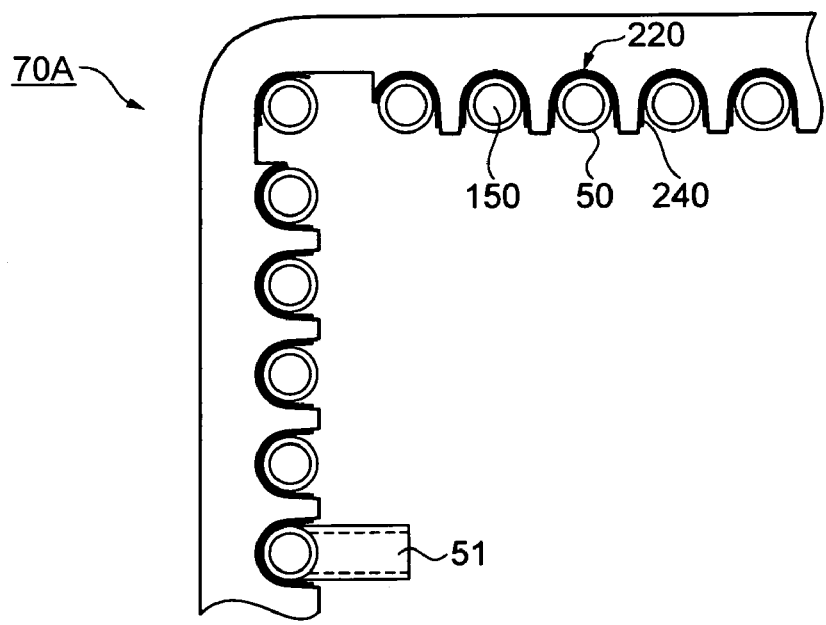
FIG. 16 is a schematic of a first housing member according to exemplary embodiment 9 of the invention.

FIG. 16 is a schematic showing that a heat-releasing flow passage is provided on the inner surface side of the first housing member. Exemplary embodiment 9 is explained using FIG. 16.

Exemplary embodiment 9 is an example of a structure supporting the heat-releasing flow passage on the inner surface side of the first housing member 70A. The first housing member 70A is formed by providing a support 220 having a sectionally U-concave form in the inner surface. The support 220 is provided on the inner surface side corresponding to the top and left-and-right surfaces of the first housing member 70A. In an assembling method, a heat-conductive member 240 of a high heat-conductive material is fixed on a concave inner surface of the support 220. Thereafter, the heat-releasing flow passage 50 is pressure-fit in the support 220 in a manner clamping the heat-conductive member 240 whereby the heat-releasing flow passage 50 is fixed in the support 220. The heat-releasing flow passage 50 projects at its flow passage 51 to be connected to the passage repeaters 14 and 15 of within the projector 1, toward the inward of the projector 1 from the side surface of the first housing member 70A.

Due to this, the heat-releasing flow passage 50 is closely fixed to the support 220 through the heat-conductive member 240. Because the provision of the heat-conductive member 240 can reduce the gap (air heat-insulation layer) at the contact surface between the heat-releasing flow passage 50 and the support 220 to a possible extent, heat resistance can be reduced to the minimum. Consequently, the heat of the heat-releasing flow passage 50 is efficiently conducted to the first housing member 70A through the heat-conductive member 240 where it is released.

In exemplary embodiment 9, the heat-conductive member 240 uses a heat-conductive double-sided adhesive tape as a high heat-conductive material. However, this is not limitative but a high heat-conductive material, such as a graphite sheet, may be used. Such graphite sheets, having anisotropy, include those having a heat conductivity of 600-800 W/(m●K) in plane direction (in direction of rolling) and 15 W/(m●K) in thickness direction. In the case of using a graphite sheet as the heat-conductive member 240, heat conduction is allowed also in the direction toward the exterior of the first housing member 70A, or in the thickness direction. However, because of good conductivity in the rolling direction, it is preferred to take a structure to release heat to the outside by providing a heat-releasing region on the side close to the projection element 30 or opposite to the projection element 30 that lies in the direction of rolling. The high heat-conductive material may use a liquid filler material, such as silicone grease. The use of silicone grease can eliminate the air layer at a contact surface between the support 220 and the heat-releasing flow passage 50 to thereby fix it more closely, which is effective as a method of reducing heat conduction loss.

Although exemplary embodiment 9 fixed, by pressure-fit, the heat-releasing flow passage 50 in the support 220 through the heat-conductive member 240, the heat-releasing flow passage 50 may be directly pressure-fit and fixed to the support 220 without using the heat-conductive member 240 provided that the housing 70 is formed of a material well in heat conductivity.

Exemplary Embodiment 9

Figure 17:
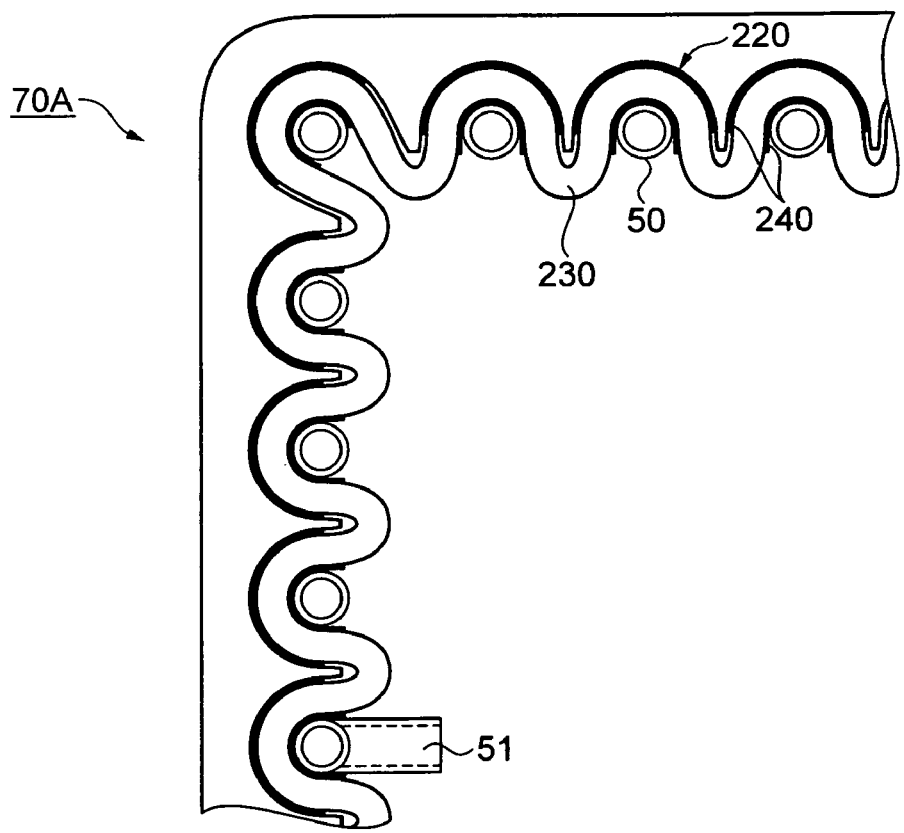
FIG. 17 is a schematic of a first housing member according to exemplary embodiment 10 of the invention.

FIG. 17 is a schematic showing that a heat-releasing flow passage and support member is provided on the inner surface side of the first housing member. Exemplary embodiment 10 is explained using FIG. 17.

Exemplary embodiment 10 is an example of a structure supporting the heat-releasing flow passage 50 on the inner surface side of the first housing member 70A by use of a support member 230. The first housing member 70A is formed by providing a support 220 having a sectionally U-concave form on the inner surface side, similar to exemplary embodiment 9. The support 220 is provided on the inner surface side corresponding to the top and left-and-right surfaces of the first housing member 70A. The support member 230, positioned between the heat-releasing flow passage 50 and the support 220, is formed by a copper-based sheet having a high heat conductivity into a corrugated sheet form.

In assembling, the heat-releasing flow passage 50 is pressure-fit in the concave of the support member 230 to thereby integrate the support member 230 and the heat-releasing flow passage 50. By inserting the concave of the support member 230 in the support 220, the heat-releasing flow passage 50 is fixed. In this case, in order to reduce the occurrence of an air insulation layer between the concave of the support member 230 and the heat-releasing flow passage 50 and between the convex of the support member 230 and the support 220 to a possible extent and minimize heat-conduction loss, a heat-conductive double sided adhesive tape similar to exemplary embodiment 9 is used and clamped between them. The heat-releasing flow passage 50 projects, at the flow passage 51 to be connected to the passage repeaters 14 and 15 of within the projector 1, toward the inward of the projector 1 from the side surface of the first housing member 70A.

Due to this, the heat-releasing flow passage 50 is closely fixed through the support member 230, the heat-conductive member 240 and the support 220. Due to the provision of the support member 230, the heat-releasing flow passage 50 is easy to pressure-fit. By an elastic force of the support member 230, it can be closely contacted with and fixed on the support 220. The heat-conductive member 240 may reduce, to some extent, the gap (air insulation layer) in the contact surfaces between the heat-releasing flow passage 50 and the support member 230 and between the support member 230 and the support 220, hence making it possible to minimize thermal resistance. Consequently, the heat of the heat-releasing flow passage 50 is efficiently conducted to the first housing member 70A through the heat-conductive member 240 and support member 230, where it is released.

Exemplary Embodiment 11

Figure 18A:
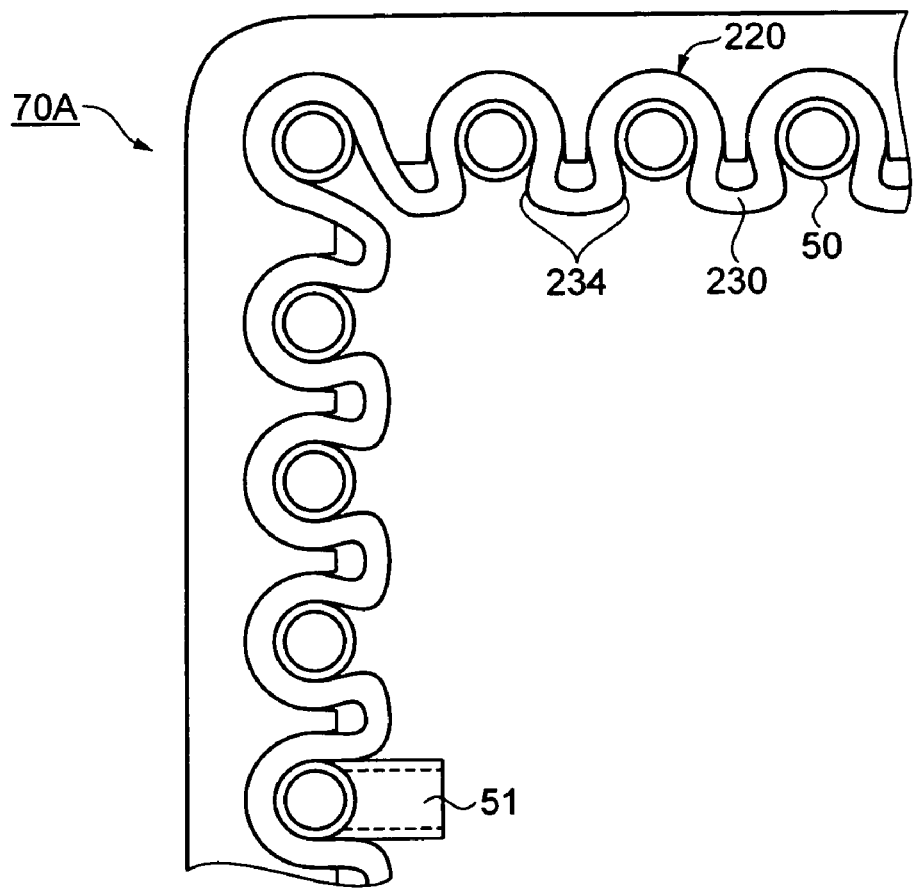
FIGS. 18A and 18B show schematics of a first housing member according to exemplary embodiment 11 of the invention.
Figure 18B:
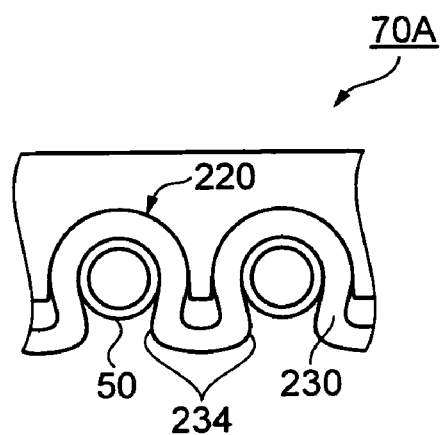

FIGS. 18A and 18B are schematics that the heat-releasing flow passage and the support member are provided on the inner surface side of the first housing member. FIGS. 18A and 18B are schematics that the heat-releasing flow passage is deformed by high-pressure fluid and fixed on the support. FIG. 18A is a schematic that the heat-releasing flow passage is deformed by high-pressure fluid and fixed on the support member and the support. The same FIG. B is a schematic that the heat-releasing flow passage is inserted in the support member and the heat-releasing flow passage is deformed by a high-pressure fluid and fixed on the support member. Exemplary embodiment 11 is explained using FIGS. 18A and 18B.

Exemplary embodiment 11, although similar in structure to exemplary embodiment 10, is an example that the heat-releasing flow passage 50 is fixed on the support member 230 by flowing a high-pressure fluid through the heat-releasing flow passage 50 and expanding (elastically deforming) the heat-releasing flow passage 50 instead of pressure-fitting the heat-releasing flow passage 50 in the support member 230.

In assembling, as shown in FIG. 18B, after the support member 230 is inserted in the support 220 and the heat-releasing flow passage 50 is inserted in the concave of the support member 230, a high-pressure fluid is passed through the interior of the heat-releasing flow passage 50 to thereby expand (elastically deform) the heat-releasing flow passage 50 and fit it in the concave of the support member 230. At this time, the support member 230 is formed into an anchor form at the convex 234 of the support member 230 with which the heat-releasing flow passage 50 is not in contact, whereby the heat-releasing flow passage 50 is fixed further positively as compared to exemplary embodiment 10. Thereafter, the support member 230 fixed with the heat-releasing flow passage 50 is fixed to the support 220. Here, exemplary embodiment 11 uses a liquid as the high-pressure fluid.

According to this assembling method, closeness is enhanced between the support member 230 and the heat-releasing flow passage 50. Because air insulation layer is less formed at the contact surface, the necessity is eliminated of using the heat-conductive member 240.

In also exemplary embodiment 9, the heat-releasing flow passage 50 may be inserted in the support 220 of the first housing member, and the heat-releasing flow passage 50 is expanded by passing a high-pressure fluid through the heat-releasing flow passage 50 thereby being fixed in the support 220. Due to this, the heat-conductive member 240 is made unnecessary by a close fit of the support 220 and the heat-releasing flow passage 50. Furthermore, in exemplary embodiments 9, 10, 11, because of the arrangement of the heat-releasing flow passage 50 on the housing inner surface side, there is an effect capable of providing a freedom and aesthetic nature in housing design.

Exemplary Embodiment 12

Figure 19A:
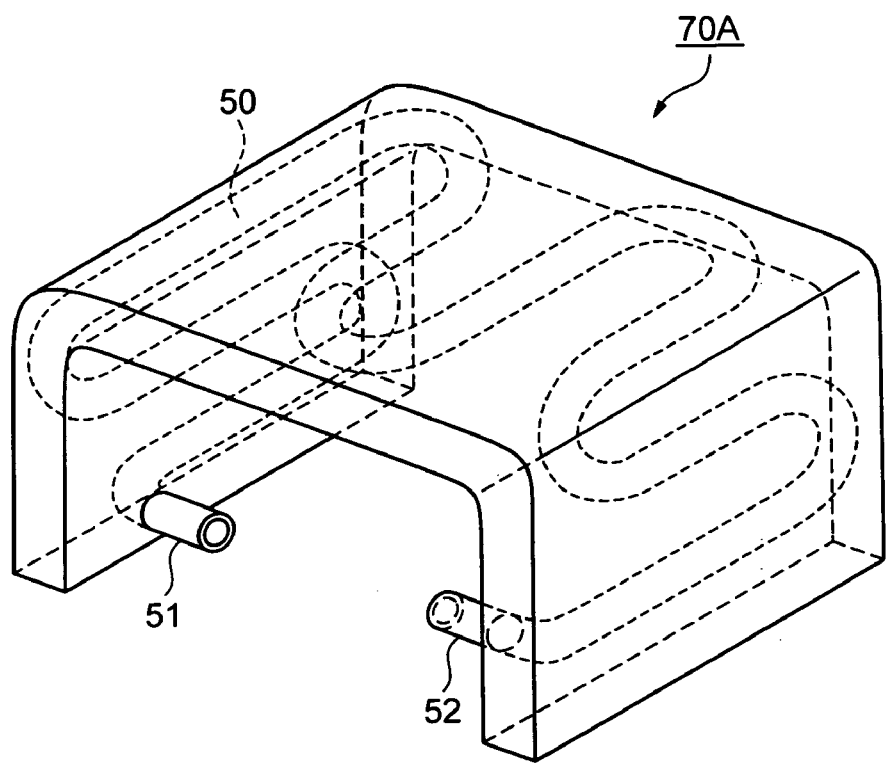
FIGS. 19A and 19B show schematics of a first housing member according to exemplary embodiment 12 of the invention.
Figure 19B:
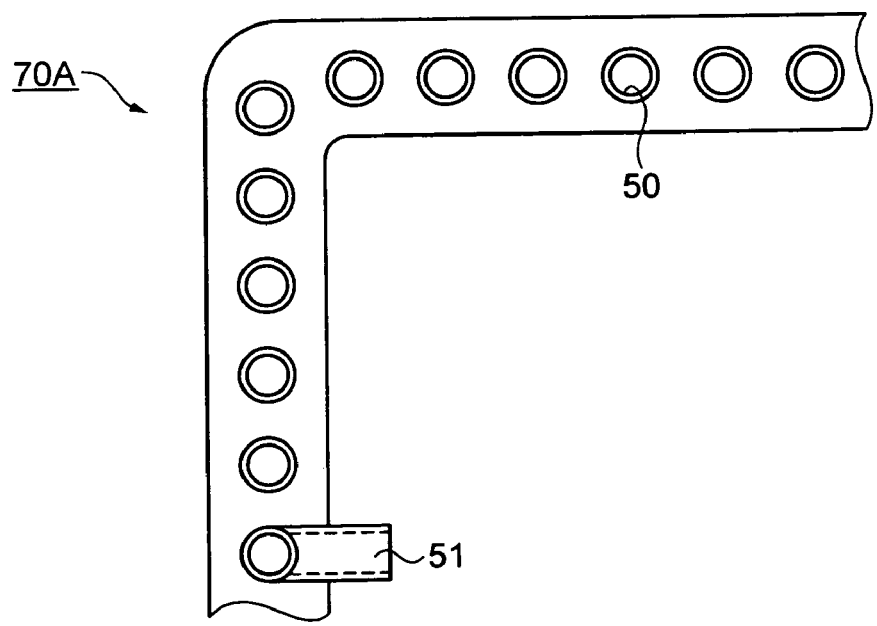

FIGS. 19A and 19B are schematics showing that a heat-releasing flow passage is formed within the first housing member. Exemplary embodiment 12 is explained using FIGS. 19A and 19B.

Exemplary embodiment 12 is an example that, as shown in FIG. 19A, closeness is enhanced between the heat-releasing flow passage 50 and the first housing member 70A by making a structure the heat-releasing flow passage 50 is inserted within the main body of first housing member 70A.

As shown in FIG. 19A, this is realized by a method of fixingly providing a heat-releasing flow passage 50 within the main body of first housing member 70A by inserting a heat-releasing flow passage 50 simultaneously with forming a first housing member 70A by injection molding or so. Although the U-formed bends of the heat-releasing flow passage 50 shown by broken line in the figure are in a coarse arrangement, they actually are in a dense arrangement in three directions at the top and left-and-right surfaces of the first housing member 70A. The heat-releasing flow passage 50 projects, at the flow passages 51 and 52 to be connected to the passage repeaters 14 and 15 of within the projector 1, inward of the projector 1 from the side surface of the first housing member 70A.

As shown in FIG. 19B, the heat-releasing flow passage 50 arranged within the main body of first housing member 70A has a contact surface closely fixed. Due to this, the heat of the cooling fluid is efficiently conducted to the housing thereby enabling to cool down the heat of the cooling fluid. Because of no provision of the heat-releasing flow passage on the outer surface side of the projector, freedom is given in the design of first housing member 70A form, various switch panels to be arranged on the outer surface side of the first housing member 70A, various printings, and so on. Because the heat-releasing flow passage 50 is formed integrally within the main body of first housing member 70A, cost is low in respect of manufacture of the first housing member 70A thus making possible to enhance producibility.

Exemplary Embodiment 13

Figure 20A:
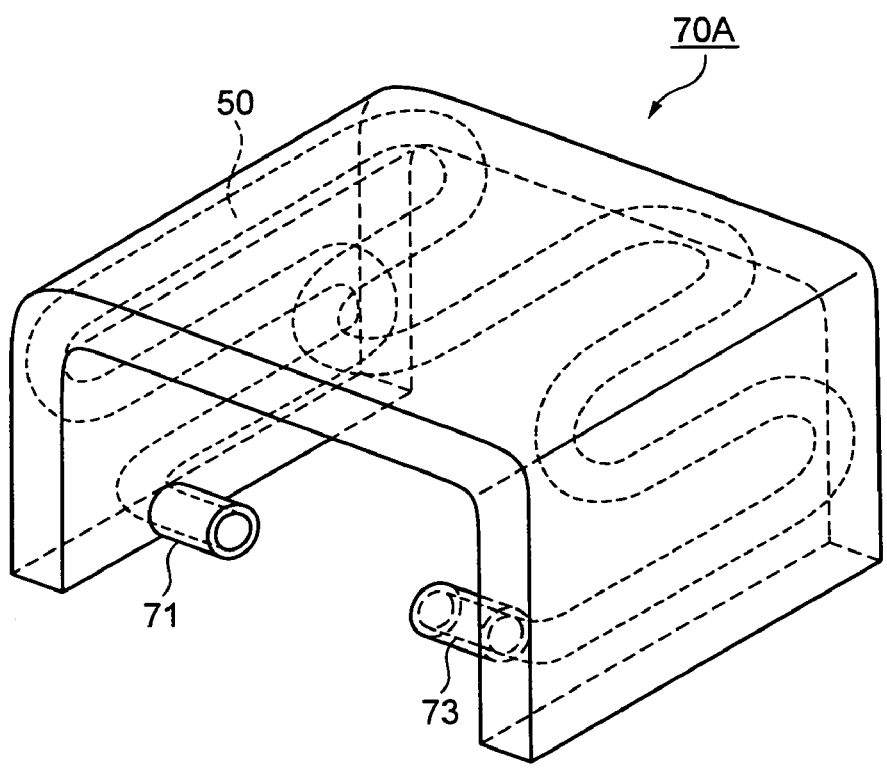
FIGS. 20A and 20B show schematics of a first housing member according to exemplary embodiment 13 of the invention.
Figure 20B:
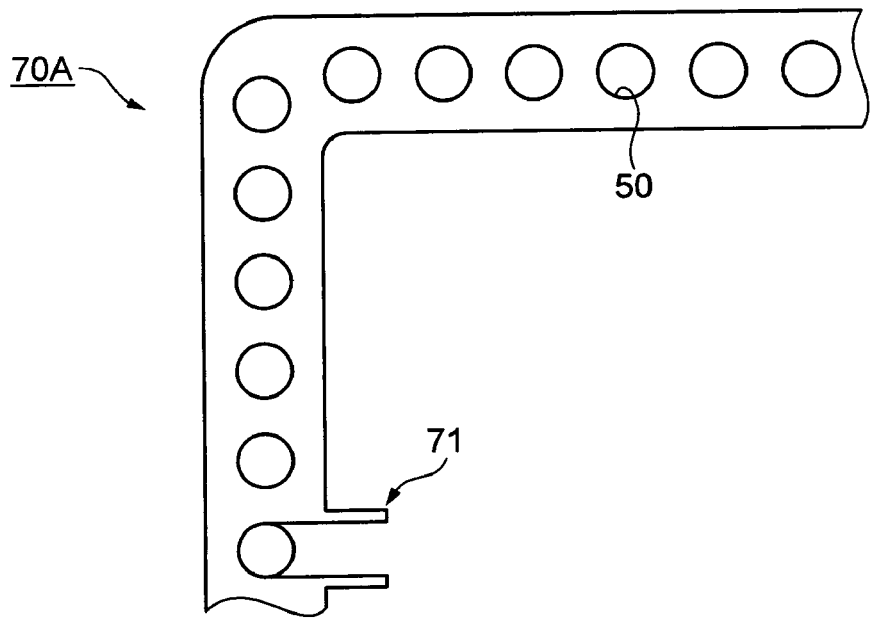

FIGS. 20A and 20B are schematics showing that a heat-releasing flow passage is formed by providing a space to act as a flow passage within the first housing member. Exemplary embodiment 13 is explained using FIGS. 20A and 20B.

As shown in FIG. 20A, in order to form a flow passage simultaneously with forming a first housing member 70A by injection molding, forming is made by a mold die using suitably a slide die and other cores by aligning the parting position at the center of a sectionally circular region of the insert die to form a sectionally circular continuous space. As shown in FIG. 20B, a heat-releasing flow passage 50 is formed as a sectionally circular continuous space within the main body of first housing member 70A. There are formed the flow passages 71 and 72 to be connected to the passage repeaters 14 and 15 within the projector 1, projecting toward the inward of the projector 1 from the side surface of the first housing member 70A.

Due to this, the heat of the cooling fluid flowing in the heat-releasing flow passage 50 can be conducted directly to the first housing member 70A, thus enabling to cool down the cooling fluid furthermore. Because of no provision of a heat-releasing flow passage on the outer surface side of the projector 1, freedom is given to the design of first housing member 70A form, various switch panels arranged on the outer surface side of the first housing member 70A, various printings, and so on. Because the heat-releasing flow passage 50 is formed integrally within the main body of first housing member 70A, cost is low in respect of manufacture of the first housing member 70A thus making possible to enhance producibility.

Exemplary Embodiment 14

Figure 21:
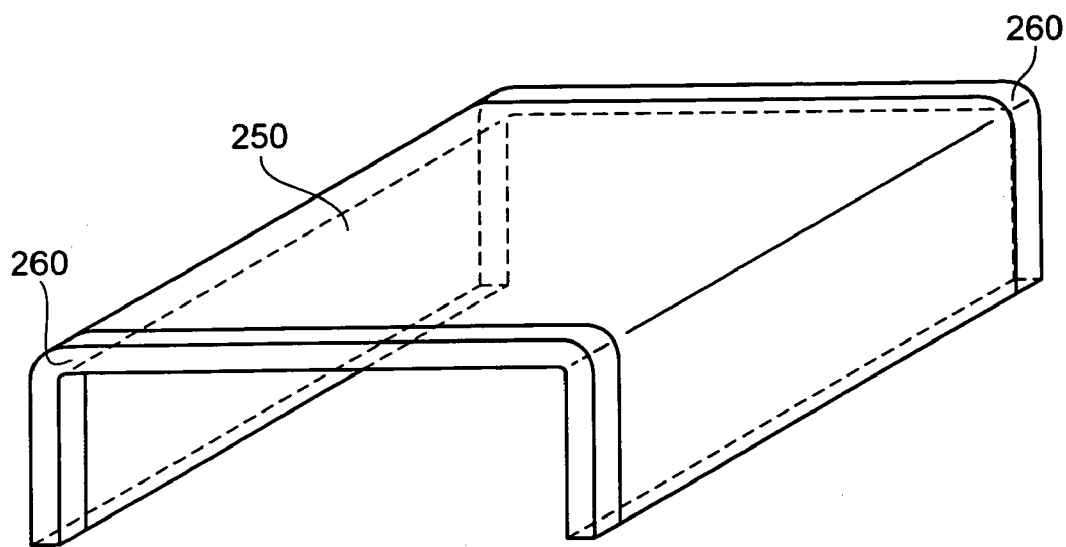
FIG. 21 is a schematic of a first housing member according to exemplary embodiment 14 of the invention.
Figure 22:
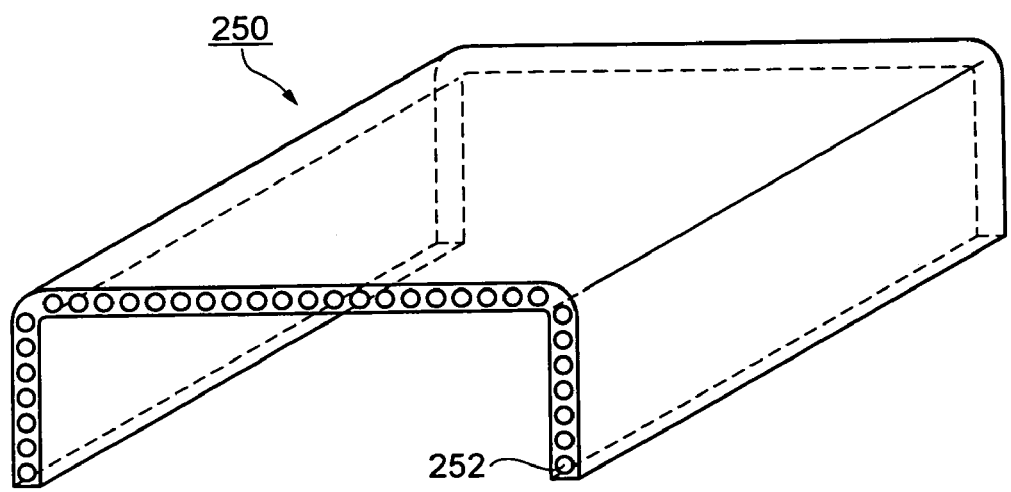
FIG. 22 is a schematic of a main housing member.
Figure 23A:
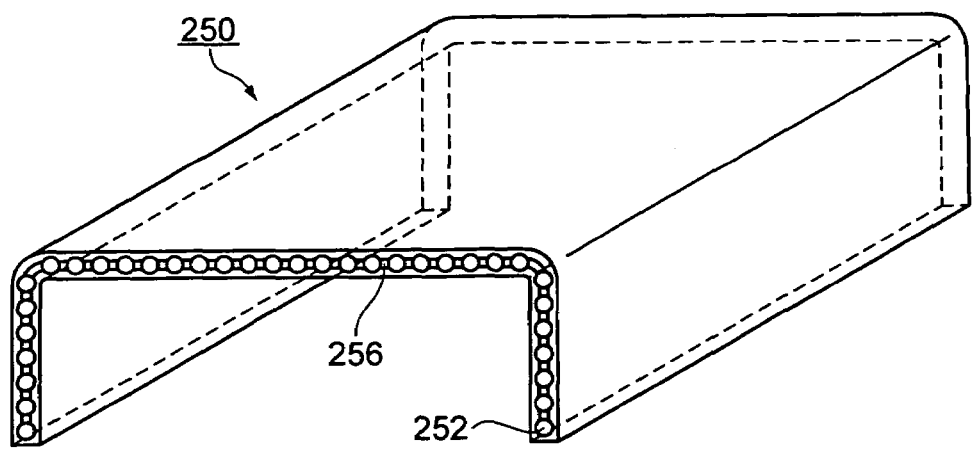
FIGS. 23A-23C show schematics of a main housing member.
Figure 23B:
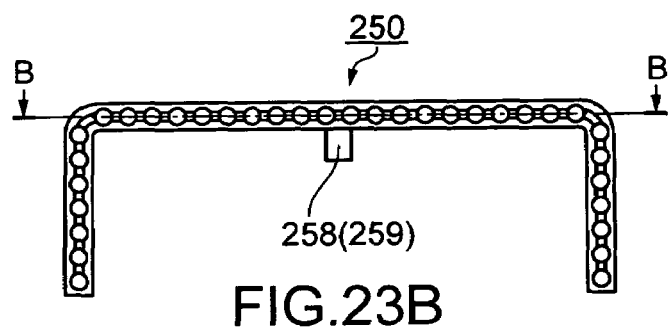
Figure 23C:
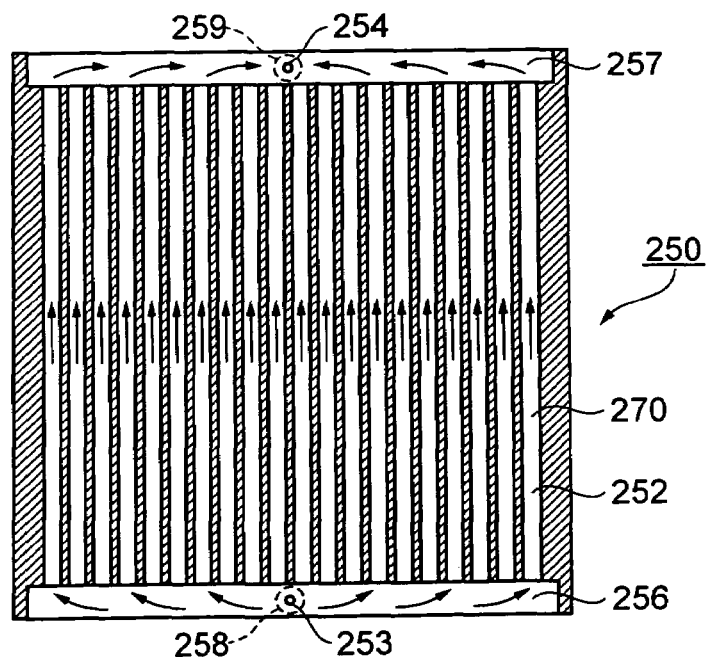

FIG. 21 is a schematic showing that the first housing member is structured by a main housing member and a sub-housing member formed at both end sides of the main housing member. FIG. 22 is a schematic immediately after forming a main housing member. FIGS. 23A-23C are schematics showing that work is done to the formed main housing member. Exemplary embodiment 14 is explained with FIGS. 21 to 23C.

As shown in FIG. 21, in exemplary embodiment 14, the first housing member 70A is in a form having generally a squared-U section, thus forming surfaces in three directions of top and left-and-right surface sides. The first housing member 70A is in a structure having a main housing member 250 having surfaces in three directions and sub-housing members 260 provided at the both ends thereof in a form corresponding to an end-face form.

As shown in FIG. 22, the main housing member 250 has through-holes 252, generally circular in section and to be made into a heat-releasing flow passage, provided generally at an even pitch in a direction toward both ends within the main body of main housing member 250. The main housing member 250 is formed with an exterior shape of main housing member 250 by extrusion of an aluminum alloy, and with through-holes 252 simultaneously.

As shown in FIG. 23A, after forming the main housing member 250, connection grooves 256 and 257 to connect all the through-holes together are cut in the both end faces of main housing member 250 by drilling or the like.

As shown in FIG. 23C, connection grooves 256 and 257 connecting parallel all the through-holes 252 are formed in both end faces of the through-holes 252 formed in the main housing member 250. At substantially the centers of the connection grooves 256 and 257, firmly fixed are flow passages 258 and 259 having passage ports 253 and 254 to be connected to the passage repeaters 14 and 15 within the projector 1, in a manner projecting from the upper-surface inner side of the main housing member 250 toward the inward of the projector 1, as shown in FIG. 23B.

As described above, the worked both ends of main housing member 250 and the sub-housing members 260 are closely joined together by diffuse-junction thereby securing waterproofness. Thus, a heat-releasing flow passage 270 is constituted by the through-holes 252 and the connection grooves 256 and 257 formed at their both end face sides (made as a structure shown in FIG. 21).

Explanation is now made as to how to flow the cooling fluid in the above heat-releasing flow passage 270.

The cooling fluid flows by a route shown by arrow in FIG. 23C. Specifically, the cooling fluid flows from the flow passage provided within the projector 1 into the connection groove 256 through the passage port 253. Then, the cooling fluid entered the connection groove 256 flows parallel the through-holes 252 into the connection groove 256. Through the passage port 253, the cooling fluid circulates and flows the heat-releasing flow passage 270 by a route entering the flow passage provided within the projector 1. By flowing of the cooling fluid through the heat-releasing flow passage 270, the heat the cooling fluid possesses is directly conducted to the main housing member 250 and released to the external air from the main body surface of main housing member 250 whereby the cooling fluid is cooled down.

The connection groove 256 is given not only an action to connect parallel the through-holes 252 but also an action as a common pressure chamber in the heat-releasing flow passage 270. The through-holes 252 has a passage sectional size made changing from place to place. Because this can regulate the pressure applied to the cooling fluid flowing all the through-holes 252 in parallel connection, it is possible to decrease the temperature gradient due to the cooling fluid over the flow passages of through-holes 252. Also, flow passage length is decreased and pressure loss can be reduced. Due to those, cooling efficiency is much enhanced of the cooling fluid flowing the heat-releasing flow passage 270.

With the use of the structure of exemplary embodiment 14, by properly adjusting the form of the connection grooves 256, 257, the position of the passage ports 253, 254 and the respective passage sectional size of the through-holes 252, the cooling fluid flowing the through-holes 252 can be made uniform in pressure. This can enhance cooling efficiency.

Because of no provision of the heat-releasing flow passage at the exterior surface side of the projector 1, freedom is given in the design of various switch panels to be arranged on the outer surface side of the first housing member 70A, various printings, and so on. Because the through-holes 252 integrally constitute a heat-releasing flow passage 270 within the main body of main housing member 250, cost is low in respect of manufacture of the main housing member 250 thus making possible to enhance producibility.

By applying the above structure, besides parallel connection of all the through-holes 252, the heat-releasing flow passage 270 may be formed divisionally on a region-by-region basis, e.g. divisionally in three directions at top surface side, left surface side and right surface side of the main housing member 250. By taking account of main housing member 250 form, the heat-releasing flow passage 270 can be modified in various ways.

The main housing member 250 and the sub-housing members 260 are closely joined by diffuse-junction. However, this is not limitative but plate-like elastic seal members (e.g. rubber-based members or the like) arranging holes corresponding to the through-holes 252 may be provided between the main housing member 250 and the sub-housing members 260, to fix the main housing member 250 and the sub-housing members 260 by mechanical joints, such as screwing. By doing so, the main housing member 250 and the sub-housing members 260 can be disassembled, which is effective in respect of maintenance, such as overhaul cleaning.

The through-holes 252 are in a form generally circular in section. However, this is not limitative but it may be generally rectangular in section or generally polygonal in section.

The main housing member 250 is a smooth flat surface in its exterior surface. However, this is not limitative and grooves or fins may be provided parallel with the direction of extrusion of extrusion working. This can use much of a display area to release the heat of the cooling fluid, thus making possible to enhance cooling efficiency furthermore.

The form of the sub-housing member 260, although in the form of a squared-U shape corresponding to the end-face form of main housing member 250, may be any form provided that it can cover the through-holes 252 and connection groove 256, 257 formed in the main housing member 250 and form a heat-releasing flow passage 270.

The main housing member 250 is formed by extrusion of an aluminum alloy. However, this is not limitative but may be formed by injection molding by use of a magnesium alloy or aluminum alloy having high heat conductivity.

Exemplary Embodiment 15

Figures 24A, 24B:
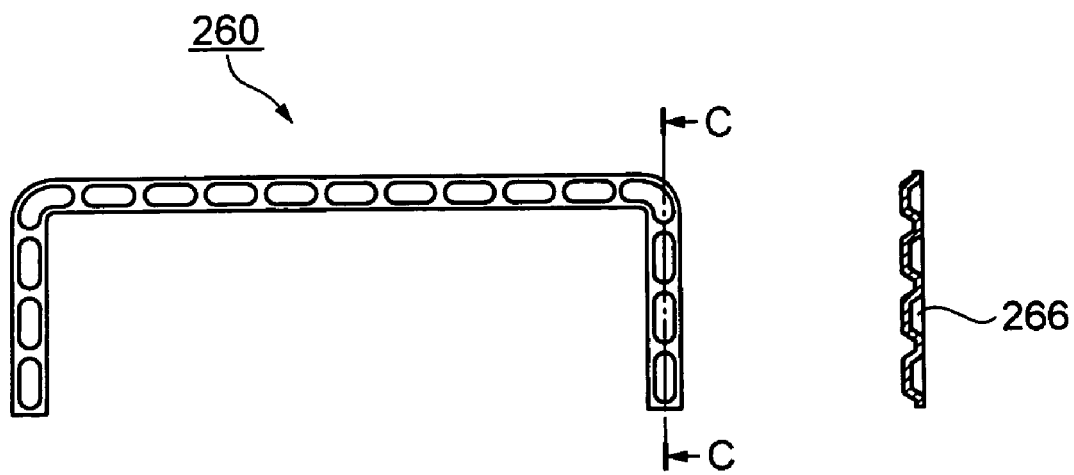
FIGS. 24A and 24B show schematics of a sub housing member according to exemplary embodiment 15 of the invention.
Figure 25:
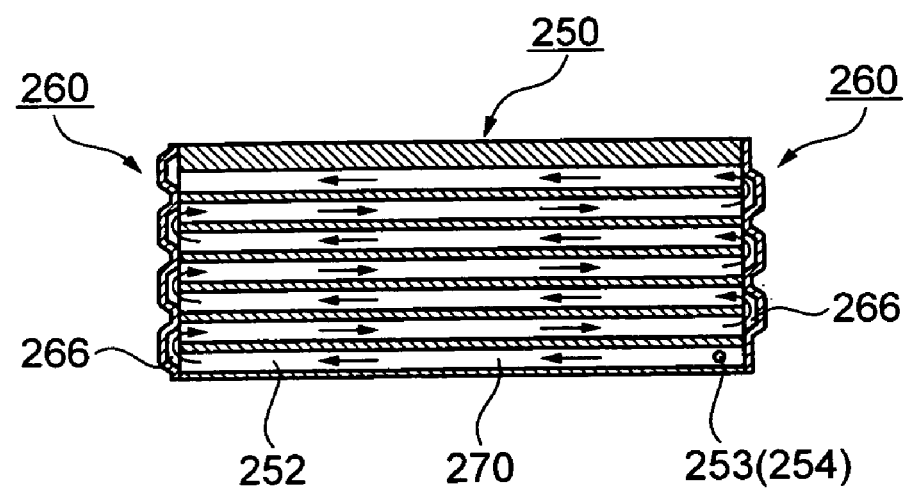
FIG. 25 is a schematic joining the sub housing members and the main housing member together.

FIGS. 24A and 24B is a schematic showing that connection grooves to connect the through-holes are formed in the sub-housing member. FIG. 25 is a schematic of joining the sub-housing members and the main housing member. Exemplary embodiment 15 is explained with using FIGS. 24A and 24B and 25.

In exemplary embodiment 15, the first housing member 70A, although similar in structure to the foregoing exemplary embodiment 14, is different in that the sub-housing member 260 is formed with connection grooves 266 to connect the through-holes 252 of the main housing member 250.

FIG. 24A is a schematic of the sub housing member while the same FIG. B is a schematic on plane C-C shown in the same FIG. A.

As shown in FIGS. 24A and 24B, the sub housing member 260 is formed with connection grooves 266 to connect between adjacent ones of the through-holes 252, in a manner assuming concaves in positions corresponding to the through-holes 252 of the main housing member 250. The sub housing member 260 is of a copper-based sheet having a high heat conductivity, and formed with the connection grooves 266 by being pressed into concaves.

In exemplary embodiment 15, a heat-releasing passage 270 is structured by closely joining the sub-housing members 260 forming connection grooves 266 to the both end faces of the main housing member 250 in a state formed with through-holes 252 as shown in FIG. 22 (made into a structure shown in FIG. 21).

As shown in FIG. 25, the main housing member 250 and the sub housing members 260 are closely joined together thereby forming a heat-releasing flow passage 270. By connecting adjacent ones of through-holes 252 through the connection grooves 266, connection is done in a zigzag form into one heat-releasing flow passage 270. At one ends of the through-holes 252 constituting the heat-releasing flow passage 270, there are provided passage ports 253 and 254 connected to the passage repeaters 14 and 15 of within the projector 1.

The manner in which the cooling fluid flows in the heat-releasing flow passage 270 is in a flow through the route shown by allow in the figure.

The cooling fluid flows from the flow passage provided within the projector 1 into one through-hole 252 through the passage port 253, to flow the connection groove 266 into the adjacent through-hole 252. Repeating such flow, the cooling fluid flows to the heat-releasing flow passage 270 thus circulating and flowing the heat-releasing flow passage 270 in a route of flow from the passage port 254 provided at the other end into the flow passage provided within the projector 1. Due to this, the heat haven by the cooling fluid is directly conducted to the main housing member 250 and released to the external air from the main body surface of the main housing member 250, thereby cooling down the cooling fluid.

By using the structure of exemplary embodiment 15, the heat of the cooling fluid is conducted efficiently to the main housing member 250 and sub housing members 260 that constitute the first housing member 70A, thus making possible to cool down the heat of the cooling fluid. Because of no provision of the heat-releasing flow passage at exterior surface side of the projector 1, freedom is given in the design of various switch panels to be arranged on the outer surface side of the first housing member 70A, various printings, and so on. Because of forming through-holes 252 integrally constituting a heat-releasing flow passage 270 within the main body of main housing member 250, cost is low in respect of manufacture of the main housing member 250, thus making possible to enhance producibility.

In exemplary embodiment 15, the sub housing member 260 is of a copper-based sheet having a high heat conductivity, and formed with connection grooves 266 by being pressed into a concave form. However, this is not limitative and forming may be done such that the connection grooves 266 assume concaves, by injection molding using a magnesium alloy or aluminum alloy having a high heat conductivity.

The form of practice is not limited to the foregoing exemplary embodiments but can be changed as in the below.

Figure 13:
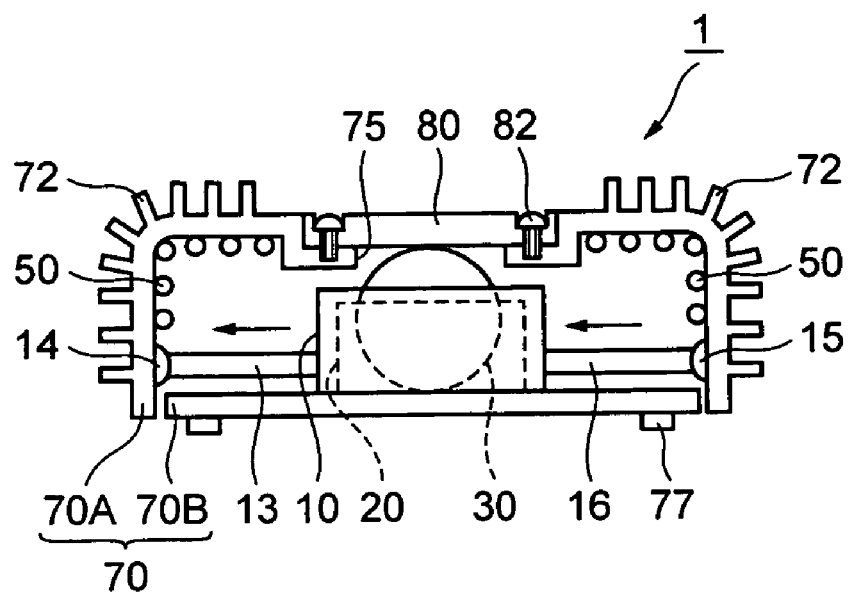
FIG. 13 is a schematic showing a modification of the projector.

Modification 1 Although the foregoing exemplary embodiments 1-3 are structured so that the heat-releasing flow passage 50 is fixed on the outer surface side of the first housing member 70A, it is possible, for example, by fixing the heat-releasing flow passage 50 on the inner surface side of the first housing member 70A and forming a fin 72 on the outer surface side, as shown in FIG. 13. Due to this, by the enhancement of heat release efficiency on the first housing member 70A using a magnesium alloy high in heat conductivity and light in weight, the cooling efficiency of the cooling fluid is enhanced furthermore.

The other structure is omitted because of the similarity to the description in exemplary embodiment 1.

Modification 2 In the foregoing exemplary embodiments, three light sources 10R, 10G, 10B are used as a light source 10 for the projector 1 to thereby emit three colors (red, green, blue). Three light valves 22R, 22G, 22B are used as a light valve 22 constituting the optical structure 20 to thereby modulate emission lights, respectively. However, as another structure, the projector 1 may be of a scheme such that one light source is used to emit white light that is modulated by one light valve, magnified by the projection element 30 and projected to the screen 40. The projector 1 may be of a scheme that white light is emitted by using one light source so that the emission light is separated into three colors (red, green, blue) and modulated by three light valves 22R, 22G, 22B, the modulated three colors (red, green, blue) of lights are combined together by a dichroic prism 26, magnified by the projection element 30 and projected to the screen 40. This allows for freely selecting a structure to adopt in designing a light source 10 and optical structure 20, thereby making possible to broadening design freedom and improving design efficiency.

Modification 3 Although the foregoing exemplary embodiments use the pump 60 in order to circulate the cooling fluid, the cooling form may be, for example, for cooling by recycling through utilization of vaporization-condensation of the cooling fluid instead of using the pump though cooling efficiency is somewhat lowered. This can size-reduce the projector furthermore.

Modification 4 Although the foregoing exemplary embodiments use a cooling fluid using ethylene glycol as a cooling fluid, it is possible to use a gas, such as nitrogen gas (N2) or argon gas (Ar) or a liquid, such as pure water, fluorine-based hydrocarbon or silicone oil.

Modification 5 In the light source 10 in each of the foregoing exemplary embodiments, the reservoir chamber 170 formed in the light-emitting element base 120 fixing the LED chip 100 may have a bottom 122 area substantially the same as the outer shape area of the LED chip 100. The reservoir chamber 170 may have a bottom 122 diameter substantially the same as the diagonal length of the LED chip 100. By thus forming the reservoir chamber 170 and structuring the light source 10, the light source 10 can be reduced in size furthermore.

Concerning LED chip 100 cooling, although there is no provision of a guide channel 128 or the like in the bottom 122, the LED chip 100 is to be cooled down by rounding the cooling fluid 150 over the top surface of the LED chip 100.

INDUSTRIAL APPLICABILITY

The projector according to exemplary aspects of the present invention is effective in cooling down the light source, and suited particularly for the projector using a light-emitting element in the light source.

The invention claimed is:

1. A projector comprising:
a light source to emit light;
an optical structure constituting an optical system to modulate or combine emission light of the light source;
a projection element to project exit light from the optical structure;
a flow passage to flow a cooling liquid for cooling the light source; and
a housing forming an exterior of the projector, the flow passage having a first connection flow passage connected to the light source, a heat-releasing flow passage disposed on the housing, a second connection flow passage connected to the light source, the first connection flow passage connected to one end of the heat-releasing flow passage, the other end of the heat-releasing flow passage connected to the second connection flow passage.

2. The projector according to claim 1, further comprising: a pump to circulate the cooling liquid in the flow passage.

3. The projector according to claim 1, the heat-releasing flow passage being formed by the housing and at least one member joined to the housing, and formed by providing a space to circulate the cooling liquid between the housing and the member.

4. The projector according to claim 1, a heat-releasing fin being provided in an outer surface of the housing.

5. The projector according to claim 1, the heat-releasing flow passage being formed protruding in an outer surface of the housing and serving also as a heat-releasing fin.

6. The projector according to claim 1, an aperture for maintenance being provided in a position of the housing opposed to the light source and the optical structure, a cover member covering the aperture being provided, the heat-releasing flow passage being provided around the aperture.

7. The projector according to claim 1, the housing including a first housing member and a second housing member, a heat-releasing flow passage being provided on the first housing member, the light source and the connection flow passage being provided on the second housing member, an aperture for maintenance being provided in a position of the first housing opposed to the light source and the optical structure, a cover member covering the aperture being provided, the heat-releasing flow passage being provided around the aperture.

8. The projector according to claim 1, the housing including a first housing member and a second housing member, the first housing member having the heat-releasing flow passage, the connection flow passage and the light source.

9. The projector according to claim 1, the housing including a first housing member and a second housing member, the first housing member having the heat-releasing flow passage, the connection flow passage, the light source, the optical structure and the projection element.

10. The projector according to claim 1, the housing including a first housing member and a second housing member, the first housing member having the heat-releasing flow passage, the connection flow passage, the light source and the optical structure, the second housing member having the projection element, a positioning mechanism being provided to position the first housing member and the second housing member in position so that the optical structure and the projection element can be aligned during assembling the first housing member and the second housing member together.

11. The projector according to claim 8, the housing including a first housing member and a second housing member, the first housing member having a pump to circulate the cooling liquid in the flow passage.

12. The projector according to claim 7, the first housing member configures an upper part including at least a top surface of the housing, the second housing member configuring a lower part including at least a bottom surface of the housing, at least the heat-releasing flow passage being provided on the first housing member.

13. The projector according to claim 1, a heat-conductive member being provided to conduct heat generated at the optical structure to the connection flow passage.

14. The projector according to claim 1, the light source having a light-emitting element or a light-emitting element array as a light source.

15. The projector according to claim 1, the light source having a light-emitting element, a light-emitting element base firmly fixing the light-emitting element, an inlet passage in the light-emitting element base for the cooling liquid to cool the light source, and an outlet passage, the inlet passage and the outlet passage being provided generally parallel with a plane of the light-emitting element base on which the light-emitting element is firmly fixed.

16. The projector according to claim 1, a grip member to grasp the projector main body being provided on the housing.

17. The projector according to claim 1, having a grip to grasp the projector main body on the housing, the heat-releasing flow passage being provided around the grip.

18. The projector according to claim 17, a grip member to grasp the projector main body being provided on the grip.

19. The projector according to claim 17, the grip being provided with an aperture for maintenance and a cover member covering the aperture.

20. The projector according to claim 1, having a support to support the heat-releasing flow passage in the housing, the heat-releasing flow passage being pressure-fit and fixed in the support.

21. The projector according to claim 20, the heat-releasing flow passage being arranged in the support, and fixed in the support by expanding the heat-releasing flow passage by a high-pressure fluid.

22. The projector according to claim 20, a heat-conductive member to conduct heat being provided and fixed between the support and heat-releasing flow passage.

23. The projector according to claim 1, comprising:
a support member supporting the heat-releasing flow passage and a support to support the support member on the housing, the support member being pressure-fit with the heat-releasing flow passage and fixed in the support.

24. The projector according to claim 23, the support member and the heat-releasing flow passage being arranged in the support, and fixed in the support by expanding the heat-releasing flow passage by a high-pressure fluid.

25. The projector according to claim 23, a heat-conductive member to conduct heat being provided and fixed at least one of between the support area and the supporting member and between the support member and the heat-releasing flow passage.

26. The projector according to claim 1, the heat-releasing flow passage being formed within a main body of the housing.

27. The projector according to claim 1, the heat-releasing flow passage being inserted in a main body of the housing.

28. The projector according to claim 1, the housing being structured by a main housing member and a sub housing member, a plurality of through-holes being formed within a main body of the main housing member, the heat-releasing flow passage being structured by joining the main housing member and the sub housing member together.

29. The projector according to claim 28, the main housing member being provided, at an end, with a plurality of grooves connecting the plurality of through-holes, the heat-releasing flow passage being structured by joining the main housing member and the sub housing member together.

30. The projector according to claim 28, a plurality of grooves to connect the through-holes being provided in the sub housing member in positions opposed to the plurality of through-holes of the main housing member, the heat-releasing flow passage being structured by joining the main housing member and the sub housing member together.

31. The projector according to claim 1, the flow passage having the connection flow connected to the light source, the connection flow passage continuing to the heat-releasing flow passage to a second connection flow passage, and then to the light source.

32. The projection according to claim 31, the connection flow passage and the second connection flow passage being the same.

* * * * *